US008423563B2

(12) United States Patent
McPeake et al.

(10) Patent No.: US 8,423,563 B2
(45) Date of Patent: Apr. 16, 2013

(54) SYSTEM AND METHODOLOGY FOR NAME SEARCHES

(75) Inventors: Cathal McPeake, Alameda, CA (US); Henry Chen, Alameda, CA (US); Ruth E. Whalen, Centennial, CO (US); Diane Vezina, Austin, TX (US)

(73) Assignee: Sybase, Inc., Dublin, CA (US)

( * ) Notice: Subject to any disclaimer, the term of this patent is extended or adjusted under 35 U.S.C. 154(b) by 1480 days.

(21) Appl. No.: 10/708,294

(22) Filed: Feb. 23, 2004

(65) Prior Publication Data

US 2005/0084152 A1    Apr. 21, 2005

Related U.S. Application Data

(60) Provisional application No. 60/481,519, filed on Oct. 16, 2003.

(51) Int. Cl.
*G06F 17/30* (2006.01)
*G06F 7/00* (2006.01)

(52) U.S. Cl.
USPC .......................................... 707/758; 382/173

(58) Field of Classification Search .................. 707/1, 3, 707/6, 100, 758; 704/250, 275, 1; 382/173
See application file for complete search history.

(56) References Cited

U.S. PATENT DOCUMENTS

| | | | | |
|---|---|---|---|---|
| 5,675,818 A * | 10/1997 | Kennedy | .......................... | 704/8 |
| 5,758,314 A * | 5/1998 | McKenna | .......................... | 704/8 |
| 5,787,452 A * | 7/1998 | McKenna | ...................... | 715/536 |
| 5,799,302 A * | 8/1998 | Johnson et al. | ................... | 707/7 |
| 6,026,398 A * | 2/2000 | Brown et al. | ..................... | 707/5 |
| 6,557,004 B1 * | 4/2003 | Ben-Shachar et al. | ........ | 707/102 |
| 6,715,672 B1 * | 4/2004 | Tetro et al. | ..................... | 235/380 |
| 6,807,264 B1 * | 10/2004 | Booton | ..................... | 379/201.04 |
| 6,963,871 B1 * | 11/2005 | Hermansen et al. | .............. | 707/6 |
| 7,010,487 B1 * | 3/2006 | Choi et al. | ..................... | 704/257 |
| 7,076,423 B2 * | 7/2006 | Boehme | ......................... | 704/229 |
| 2004/0148282 A1 * | 7/2004 | Gardiner | ........................... | 707/3 |
| 2006/0095368 A1 * | 5/2006 | Stretton | ......................... | 705/39 |

OTHER PUBLICATIONS

Sun Microsystems, Introduction to JSR 168—The Java Portlet Specification, Jul. 2003, Sun Microsystems, Inc. (19 pages).*
Gosling, J. et al., The Java Language Eavironment: A White Paper, Oct. 1995, SUN Microsystems Computer Company (86 pages).*
Date, C.J., An Introduction to Database Systems, Chapter 1: Overview of Database Management, vol. 1,5th Ed., 1990 (52 pages).*
Sum Microsystems, Introduction to JSR 168—The Java Portlet Specification, Jul. 2003, Sun Microsystems, Inc. (19 pages).
Gosling, J. et al., The Java Language Environment: A White Paper, Oct. 1995, Sun Microsystems Computer Company (86 pages).
Date, C.J., An Introduction to Database Systems, Chapter 1: Overview of Database Management, vol. 1, 5$^{th}$ Ed., 1990 (52 pages).

* cited by examiner

*Primary Examiner* — Sathyanarayan Pannala
(74) *Attorney, Agent, or Firm* — Sterne, Kessler, Goldstein & Fox P.L.L.C.

(57) ABSTRACT

A system and methodology for name searches is described. In one embodiment, for example, a method is described for determining whether a particular name comprising one or more words matches any names on a list of names, the method comprises steps of: generating codes characterizing the particular name by generating a code for each word of the particular name that is based at least in part on phonetic sounds of the word and on whether characters of the word match a pattern occurring in a proper name in a given natural language; deriving an initial set of any matching names by comparing the codes of the particular name against corresponding codes for the list of names; and deriving a final set of any matching names by comparing words of the particular name against words of names in the initial set.

60 Claims, 23 Drawing Sheets

| Pat List Entry Adm | | | ? ⌃ X |
|---|---|---|---|
| Look up name (or partial name): | b* | Find | Search Tips |
| -- OR -- | | | |
| Browse a suspect list: | Choose below ▼ | Browse List | |
| List | Name | Type | Active? |
| SDN | BARON DIAZ, Carlos Arturo | IND | Yes |
| SDN | BADR 7 | VES | Yes |
| SDN | BAEZA MOLINA, Carlos Alberto | IND | Yes |
| SDN | BECHARA SIMANCA, Salim | IND | Yes |
| SDN | BENITEZ CASTELLANOS, Cesar Tulio | IND | Yes |
| Prev Page | Page 3 of 30 | | Next Page |

FIG. 5B

Search for suspect:

Full name: bin laden — 611

Country: — 621

635 — [Search For Suspect] — 635

| Field Name | List Type | Secure | List Field Name | List Field Value | Match Comment |
|---|---|---|---|---|---|
| ISLAMIC ARMY | SDN | false | Alias | USAMA BIN LADEN ORGANIZATION | 100.00 |
| BIN LADIN, Usama bin Muhammad bin Awad | SDN | false | Name | BIN LADIN USAMA BIN MUHAMMAD BIN AWAD | 93.33 |

```
1:  public  static String[] altCode(String arg)
2:  {
3:    int current= 0;
4:    int len = arg.length();
5:    int last= len- 1; //zero based index
6:    //String primary, secondary;
7:
8:    String[]  retValues  = new String[2];
9:    //Vector   returnV   = new Vector();
10:     for (int  i=0;i<retValues.length;i++){retValues[i] ="";}
11:
12:    if (len < 1)
13:    {
14: //     returnV.add(0,retValues[0]);
15: //     returnV.add(1,retValues[1]);
16:       return retValues;
17:    }
18:    boolean  alternate = false;
19:    arg = arg.toUpperCase();
20:    //pad the original string  so that we can index beyond
    the edge of the world
21:    arg += "    ";
22:
23:    //skip these when at start of word:  "GN", "KN", "PN"',
"WR", "PS"
24:    if (StringAt(0, arg,WORD_START_SKIP_1))
25:       {current+=  1;}
26:
27:    //Initial 'X' is pronounced 'Z' e.g. 'Xavier'
28:    if (arg.charAt(0)  = = 'X')
29:    {
30:       retValues[0]  + = "S"; //'Z' maps to 'S'
31:       retValues[1]  + = "S"; //'Z' maps to 'S'
32:       current+= 1;
33:    }
34: //continued
```

FIG. 7

```
35: //////////   main loop   /////////////////////
36: while(current < len)
37:   {
38:   switch(arg.charAt(current))
39:     {
40:      case 'A':
41:      case 'E':
42:      case 'I':
43:      case 'O':
44:      case 'U':
45:      case 'Y':
46:        if (current == 0)
47:          {
48:           //all in it vowels now map to 'A'
49:           retValues[0] + = "A";
50:           retValues[1] +="A";
51:          }
52:          current +=1;
53:          break;
54:
55:      case 'B':
56:        // "-mb", e.g", "dumb", already skipped over ...
57:        retValues[0] += "P";
58:        retValues[1] + = "P";
59:        if (arg.charAt(current + 1) = = 'B')
60:           {current +=2;}
61:        else
62:           {current +=1;}
63:        break;
64: // ...
```

FIG. 8

```
 1:        case 'C':
 2:        // various germanic
 3:          if ((current> 1)
 4:            && !isVowel(current- 2,arg)
 5:            && StringAt((current - 1),arg, "ACH")
 6:            && ( (arg.charAt(current + 2) ! = 'I')
 7:            && ((arg.charAt(current + 2) ! = 'E')
 8:                // StringAt((current- 2), arg, C_GERMANIC)
 9:                      )
10:                )
11:          )
12:         {
13:          retValues[0] += "K";
14:          retValues[1] += "K";
15:          current +=2;
16:          break;
17:          }
18:
19:         // special case 'caesar'
20:        if ((current == 0) && StringAt(current, arg, "CAESAR"))
21:          {
22:          retValues[0] += "S";
23:          retValues[1] += "S";
24:          current +=2;
25:          break;
26:          }
27:        //italian 'chianti'
28:        if (StringAt(current, arg, "CH IA"))
29:          {
30:          retValues[0] += "K";
31:          retValues[1] += "K";
32:          current +=2;
33:          break;
34:          }
35:
36:        if (StringAt(current, arg, "CH"))
37:           {
38:           //find 'michael'
39:           if ((current > 0) && StringAt(current,arg, "CHAE"))
40:           {
41:            retValues[0] += "K";
42:            alternate = true;
43:            retValues[1] += "X";
44:            current +=2;
45:            break;
46:           }
47:
```

FIG. 9A

```
48:         // greek roots  e.g. 'chemistry', 'chorus'
49:         if((current == 0)
50:             && StringAt((current + 1), arg,C_GREEK)
51:             && !StringAt(0, arg, "CHORE"))
52:         {
53:            retValues[0] += "K";
54:            retValues[1] += "K";
55:            current +=2;
56:            break;
57:         }
58:         //germanic, greek, or otherwise 'ch' for 'kh' sound
59:         if ((StringAt(0, arg,GERMANIC))
60:             // 'architect but not 'arch', 'orchestra', 'orchid'
61:             || StringAt((current- 2), arg, C_RCH)
62:             || StringAt((current + 2), arg, C_TS)
63:             || ((StringAt((current- 1), arg, C_AOUE) || (current == 0))
64:             // e.g., 'wachtler', 'wechsler', but not 'tichner'
65:             && StringAt((current + 2), arg, C_LRNMBHFVW)))
66:         {
67:            retValues[0] += "K";
68:            retValues[1] += "K";
69:         }
70:         else
71:         {
72:           if (current > 0)
73:           {
74:            if (StringAt(0, arg, "MC"))
75:            {
76:             // e.g.,  "McHugh"
77:             retValues[0] += "K";
78:             retValues[1] += "K";
79:            }
80:            else
81:            {
82:             retValues[0] +="X";
83:             alternate = true;
84:             retValues[1] +="K";
85:            }
86:           }
87:           else
88:           {
89:              retValues[0] +="X";
90:              retValues[1] += "X";
91:           }
92:          }
93:          current +=2;
94:          break;
95:         }
```

FIG. 9B

```
96:         // e.g, 'czerny'
97:         if (StringAt(current, arg, "CZ") &&
!StringAt((current- 2), arg,
98:           "WICZ"))
99:         {
100:        retValues[0] + = "S";
101:        alternate = true;
102:        retValues[1] +="X";
103:        current+= 2;
104:        break;
105:      }
106:      //e.g., 'focaccia'
107:      if (StringAt((current + 1), arg, "CIA"))
108:      {
109:        retValues[0] + = "X";
110:        retValues[1] +="X";
111:        current+= 3;
112:        break;
113:      }
114:
115:      //double 'C', but not if e.g. 'McClellan'
116:      if (StringAt(current, arg, "CC") && !((current= = 1) &&
(arg.charAt(0)
117:        = = 'M')))
118:      {
119:      // 'bellocchio' but not 'bacchus'
120:        if (StringAt((current + 2), arg, C_IEH) &&
!StringAt((current + 2),
121:        arg, "HU"))
122:        {
123:      //'accident', 'accede' 'succeed'
124:        if (((current  == 1) && (arg.charAt(current - 1)== 'A'))
125:        || StringAt((current- 1), arg,C_UCC))
126:        {
127:           retValues[0]  += "KS";
128:           retValues[1] += "KS";
129:        }
130:        //'bacci', 'bertucci', other  italian
131:        else
132:        {
133:           retValues[0] += "X";
134:           retValues[1] += "X";
135:        }
136:        current+= 3;
137:        break;
138:        }
139:      else
140:      {//Pierce's rule
141:         retValues[0] += "K";
142:         retValues[1] += "K";
143:         current+= 2;
144:         break;
145:      }
146:    }
147:
```

FIG. 9C

```
148:       if (StringAt(current, arg, C_CKCGCQ))
149:       {
150:        retValues[0] += "K";
151:        retValues[1] += "K";
152:        current+= 2;
153:        break;
154:         }
155:
156:       if (StringAt(current, arg, C_CICECY))
157:       {
158:       // italian vs. english
159:       if (StringAt(current, arg, C_CIOCIECIA))
160:        {
161:          retValues[0]  + = "S";
162:          alternate  = true;
163:          retValues[1] +="X";
164:          }
165:        else
166:          {
167:          retValues[0]  + = "S";
168:          retValues[1] += "S";
169:          }
170:        current+= 2;
171:       break;
172:        }
173:
174:      // else
175:       retValues[0] + = "K";
176:       retValues[1] += "K";
177:
178:       //name  sent in 'mac caffrey', 'mac gregor
179:         if (StringAt((current + 1), arg,C_CQG))
180:         {current+= 3;}
181:         else
182:         {
183:         if (StringAt((current + 1), arg,C_CKQ)
184:         && !StringAt((current + 1),arg,C_CECI))
185:         {current+= 2;}
186:         else
187:         {current+= 1;
188:          }
189:       break;
190: //   ..
```

FIG. 9D

```
1:    case 'J':
2:    //obvious  spanish, 'jose', 'san jacinto'
3:    if (StringAt(current, arg, "JOSE") || StringAt(0, arg,
"SAN ") )
4:       {
5:          if (((current == 0) && (arg.charAt(current + 4) = '
'))
6:          || StringAt(0, arg, "SAN ") )
7:          {
8:            retValues[0] += "H";
9:            retValues[1] += "H";
10:         }
11:         else
12:         {
13:           retValues[0] +=  "J";
14:           alternate = true;
15:           retValues[1] += "H";
16:         }
17:         current += 1;
18:         break;
19:       }
20:
21:    if ((current == 0) && !StringAt(current, arg,"JOSE"))
22:       {
23:          retValues[0] += "J";
24:          alternate = true;
25:          retValues[1] += "A"; //Yankelovich/Jankelowicz
26:       }
27:       else
28:       {
29:       // spanish pron. of e.g. 'bajador'
30:       if (isVowel(current- 1,arg)
31:          && !slavoGermanic(arg)
32:          && ((arg.charAt(current + 1) = = 'A') ||
           (arg.charAt(current + 1) = = 'O')))
33:       {
34:          retValues[0]  += "J";
35:          alternate  = true;
36:          retValues[1]  += "H";
37:       }
38:       else
39:       {
40:          if(current == last)
41:          {
42:            retValues[0] += "J";
43:            alternate = true;
44:          }
```

FIG. 10A

```
45:            else
46:         {
47:            if (!StringAt((current + 1), arg, J_LTKSNMBZ)
48:            && !StringAt((current- 1),arg, J_SKL))
49:            {
50:                retValues[0] += "J";
51:                retValues[1] += "J";
52:            }
53:         }
54:      }
55:    }
56:    if (arg.charAt(current + 1) == 'J')/ /it could happen!
57:        {current += 2;}
58:        else
59:        {current += 1;}
60:        break;
```

FIG. 10B

```
1:      public static double score(String inString1, String
inString2)
2:      {
3:             //_log.info("parameter to method   : score : <" +
inString1 +"> inString2   <" + inString2   + ">");
4:         //Get rid of any whitespace that may be on the strings
5:         //&& drop the strings to lower case (nvr)
6:         //optimistic choice for match use the shortest string to
search in the longest
7:             inString1 = inString1.trim().tolowerCase();
8:             inString2 = inString2.trim().tolowerCase();
9:             int inStringlen1 = inString1.length();
10:            int inStringlen2 = inString2.length();
11:            float leadingCharMatched = (float)0.55;
12:            float  leadingCharTransposed = (float)1.0;
13:            //if (inStringlen1 < inStringlen2)
14:            if (inStringlen1 < inStringlen2)
15:            {
16:               while  (inString1.length() < inStringlen2)
17:               {inString1 +=II 11 ;}
18:            }
19:            else if (inStringlen1 > inStringlen2)
20:            {
21:               while  (inString2.length() < inStringlen1)
22:               {inString2 +=II 11 ;}
23:            }
24:            //The  matching window is always half the length of
the second string rounded down
25:            int matchlength = inString2.length() I 2;
26:            int numberOfMatchingCharacters = 0;
27:            int numberOfTranspositions = 0;
28:            double  score = 0;
29:            /*
30:            **Optimization - if the two strings  match exactly
then don't bother going any further, just return a
31:            **value of 1.000.
32:            */
33:            if (inString1.equals(inString2))
34:            {
35:                score= 1.000;
36:            }
37:            else   //Do the Jaro-Winkler match
38:            {
39:                StringBuffer buf1 = new
StringBuffer(inString1)
40:                for (inti = 0; i < buf1.length();  i++)
41:                {
42:                   char c = buf1.charAt(i);
43:                   // The  start & end points roll with the
position of the character in the first string
44:                   int matchStart = i - (matchlength I 2);
```

FIG. 11A

```
45:                    if (matchStart   < 0)
46:                    {
47:                            matchStart = 0;
48:                    }
49:                    int matchEnd   = i + (matchlength I
2);
50:                    if (matchEnd   > inStringlen2)
51:                    {
52:                    matchEnd   = inStringlen2;
53:                    }
54:              //_log.debug(" Matching window from
character"  + matchStart + "to" + matchEnd);
55:           //First just check if it's at exactly the same
position in the second string, this avoids
56:           //the problem of false transpositions where it
finds the correct character but at an earlier point
57:           int matchPoint = inString2.indexOf(c, i);
58:           if (matchPoint == I
59:                {
60:                numberOfMatchingCharacters++;
61:           if (matchPoint == 0) {
62:                leadingCharMatched   = (float)
leadingCharMatched + (float) 0.2;
63:                }
64:           else if (matchPoint   == 1) {
65:         leadingCharMatched   = (float) leadingCharMatched +
(float) 0.15;
66:                }
67:           else if (matchPoint   == 2) {
68:         leadingCharMatched   = (float) leadingCharMatched +
(float) 0.1;
69:                }
70:     //_log.debug(IIMatching   character : II + c + found
exactly at position + matchPoint + "number of name matches now"
+ numberOfMatchingCharacters);
71:                }
72:           else   //see if it's within the match window of
characters
73:           {
74:                matchPoint = inString2.indexOf(c,
matchStart);
75:         //_log.debug("Matching   character   :" + c + "at
position " + matchPoint);
76:           //if the character   is found
77:           if (matchPoint >= 0)
78:           {
79:                if (matchPoint >= matchStart   && matchPoint
<= matchEnd)
80:           {
81:                numberOfMatchingCharacters++;
82:           if (matchPoint == 0) {
83:           leadingCharMatched = (float) leadingCharMatched
+ (float) 0.2;
84:                }
```

FIG. 11B

```
85:            else if (matchPoint == 1) {
86:                leadingCharMatched = (float) leadingCharMatch ed
+ (float) 0.15;
87:            }
88:            else if (matchPoint == 2) {
89:               leadingCharMatched  = (float) leadingCharMatched
+ (float)0.1;
90:            }
91:          // log.debug(11 Matching character :"+c + found at
position "+ matchPoint  + "number  of name matches now" +
numberOfMatchingCharacters);
92:             //But if it's not in exactly the same place then
it's a transposition
93:           if (matchPoint != i)
94:             {
95:             numberOfTranspositions++;
96:           if (matchPoint == 0) {
97:             leadingCharTransposed   = (float)
leadingCharTransposed-(float) 0.2;
98:             }
99:           else if (matchPoint == 1) {
100:              leadingCharTransposed  = (float)
leadingCharTransposed-(float) 0.15;
101:              }
102:           else if (matchPoint == 2) {
103:              leadingCharTransposed  = (float)
leadingCharTransposed-(float) 0.1;
104:                }
105:          // log.debug("Transposition of characters in
match, total transpositions now : " +numberOfTranspositions);
106:                }
107:              }
108:            }
109:          else
110:            {
111:            //If the letter was not found at all then
that's also counted as a transposition NOT nvr
112:            //numberOfTranspositions++;
113:              }
114:            }
115:          }
116:             float nomChars  =
(float)numberOfMatchingCharacters;
117:             float score1 = 0;
118:             float score2 = 0;
119:             float score3 = 0;
120:         /*
121:         ** It is possible for leadingCharMatched to be more
than one, e.g 'MEEK' v's 'MEK'. It's
122:         ** not a problem for this since it indicates
duplicate letters appeared but make it 1.0
123:         ** to keep the scores total from being > 100.00.
124:         */
125:          if (leadingCharMatched > (float) 1.0) {
126:             leadingCharMatched  = (float) 1.0;
127:              }
```

FIG. 11C

```
128:        if (nomChars==1)
129:        {
130:            score1 = (nomChars I
(float)inStringLen1)*(float)0.5 * (float) leadingCharMatched;
131:            score2 = (nomChars I
(float)inStringLen2)*(float)0.5 * (float) leadingCharMatched;
132:            score3 = (float)0.0;
133: //_log.debug("nomChars:
<"+nomChars+">numberOfTranspositions:
<"+numberOfTranspositions+">");
134:        //System.out.println("nomChars:
<"+nomChars+">numberOfTranspositions:
<"+numberOfTranspositions+">");
135:            }
136:        else if (nomChars==2)
137:        {
138:            score1 = (nomChars I
(float)inStringLen1)*(float)0.45 * (float) leadingCharMatched;
139:            score2 = (nomChars I
(float)inStringLen2)*(float)0.45 * (float) leadingCharMatched;
140:        score3 = ((1 - ((float)numberOfTranspositions)
InomChars)) * (float)0.1 * (float) leadingCharTransposed;
141:    //_log.debug("nomChars:
<"+nomChars+">numberOffranspositions:
<"+numberOfTranspositions+">");
142:    //System.out.println("nomChars:
<"+nomChars+">numberOfTranspositions:
<"+numberOfTranspositions+">");
143:            }
144:        else if (nomChars==3)
145:            {
146:            score1 = (nomChars I
(float)inStringLen1)*(float)0.40 * (float) leadingCharMatched;
147:            score2 = (nomChars I
(float)inStringLen2)*(float)0.40 * (float) leadingCharMatched;
148:        score3 = ((1 - ((float)numberOfTranspositions)
InomChars)) * (float)0.2 * (float) leadingCharTransposed;
149:    //_log.debug("nomChars:
<"+nomChars+">numberOffranspositions:
<"+numberOfTranspositions+">");
150:    //System.out.println("nomChars:
<"+nomChars+">numberOfTranspositions:
<"+numberOfTranspositions+">");
151:            }
```

FIG. 11D

```
152:        else if (nomChars>3)
153:        {
154:            score1 = ((nomChars I
(float)inStringLen1)*(float)0.333333) *(float)
leadingCharMatched;
155:            score2 = ((nomChars I
(float)inStringLen2)*(float)0.333333) *(float)
leadingCharMatched;
156:            score3 = (((1 - ((float)numberOfTranspositions)
Inom-Chars)))* (float)0.333334 *(float) leadingCharTransposed;
157:        //System.out.println("*******more than 3 chars
matched " + score1 + " " + score2 + " " + score3 + " " +
leadingCharMatched + " "+ leadingCharTransposed);
158:        //_log.debug("nomChars: <
"+nomChars+">numberOffranspositions: <
"+numberOfTranspositions+">");
159:        //System.out.println("nomChars:
<"+nomChars+">numberOffranspositions:
<"+numberOfTranspositions+">");
160:        }
161:        else
162:        {
163:          return 0;
164:        }
165:        score = score1 + score2 + score3;
166:        //_log.debug("score1: <" + score1+ ">
score2:<"+score2 +"> score3: <"+score3 +">");
167:        }
168:    //adjust the score if the lengths of the two strings is
greatly disparate
169:    if ((inStringLen1 < (inStringLen2-2))
"(inStringLen>(inStringLen2 + 2))) {
170:      score= score* 0.85;
171:    }
172:    //adjust  the score if the lengths  of the two strings
is two characters
173:    else if ((inStringlen1 = = (inStringlen2-2)) II
(inStringLen1 ==(inStringLen2 + 2))) {
174:      score= score* 0.925;
175:    }
176:    //_log.info("return from method : score : " + score +
"<matching>"+ inString1 +"<to>"+ inString2 + "<");
177:    //return (new Float((float)((score +.00
Sf)*1000f))).intValue() I 100f;
178:    return (double)((score)*1000.0f);
179:    }
```

FIG. 11E

SYSTEM AND METHODOLOGY FOR NAME SEARCHES

CROSS REFERENCE TO RELATED APPLICATIONS

The present application is related to and claims the benefit of priority of the following commonly-owned, presently-pending provisional application(s): application Ser. No. 60/481,519, filed Oct. 16, 2003, entitled "System and Methodology for Name Searches", of which the present application is a non-provisional application thereof. The disclosure of the foregoing application is hereby incorporated by reference in its entirety, including any appendices or attachments thereof, for all purposes.

COPYRIGHT STATEMENT

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

APPENDIX DATA

Computer Program Listing Appendix under Sec. 1.52(e): This application includes a transmittal under 37 C.F.R. Sec. 1.52(e) of a Computer Program Listing Appendix. The Appendix, which comprises text file(s) that are IBM-PC machine and Microsoft Windows Operating System compatible, includes the below-listed file(s). All of the material disclosed in the Computer Program Listing Appendix can be found at the U.S. Patent and Trademark Office archives and is hereby incorporated by reference into the present application.

Object Description: SourceCode.txt, created: Feb. 20, 2004, 2:19pm, size: 146 KB; Object ID: File No. 1; Object Contents: Source Code.

BACKGROUND OF INVENTION

1. Field of the Invention

The present invention relates generally to information processing environments and, more particularly, to a system providing methodology for searching for matching names.

2. Description of the Background Art

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a database management system or DBMS is typically provided as a software cushion or layer. In essence, the DBMS shields the database user from knowing or even caring about underlying hardware-level details. Typically, all requests from users for access to the data are processed by the DBMS. For example, information may be added or removed from data files, information retrieved from or updated in such files, and so forth, all without user knowledge of the underlying system implementation. In this manner, the DBMS provides users with a conceptual view of the database that is removed from the hardware level.

DBMS systems have long since moved from a centralized mainframe environment to a de-centralized or distributed environment. Today, one generally finds database systems implemented as one or more PC "client" systems, for instance, connected via a network to one or more server-based database systems (SQL database server). Commercial examples of these "client/server" systems include Powersoft® clients connected to one or more Sybase® Adaptive Server® Enterprise database servers. Both Powersoft® and Sybase® Adaptive Server® Enterprise (formerly Sybase® SQL Server®) are available from Sybase, Inc. of Dublin, Calif. The general construction and operation of database management systems, including "client/server" relational database systems, is well known in the art. See e.g., Date, C., "An Introduction to Database Systems, Seventh Edition", Addison Wesley, 2000, the disclosure of which is hereby incorporated by reference.

DBMS systems are in use today in a wide range of applications, including banking, insurance, manufacturing, airline ticketing, and many others. Tremendous quantities of information are stored in DBMS systems and they are used in many "mission critical" applications. Although DBMS systems are widely used and store large amounts of information, it can be difficult in certain circumstances to accurately identify particular information of interest in a DBMS system. One particular problem is in determining whether a database contains information about a particular person.

More generally, name recognition and name matching (whether in the context of a DBMS system or otherwise) are increasingly important to both government and business users. The terrorist events of Sep. 11, 2001 and the passage of the USA Patriot Act have greatly increased the pressure on federal agencies and private organizations such as banks, airlines, and insurance companies to ensure great diligence concerning business conducted with specific individuals and organizations. For example, when presented with a document such as a passport or credit card, many organizations are now required by law to check whether the name on the document is also on a "watch list" of terrorist sympathizers and their supporters.

While it might seem simple to check given names against a list (e.g., an official watch list), there are a number of fundamental problems in accurately identifying a particular person by name. First, official lists frequently contains spelling errors, abbreviations, and other anomalies that make matching a name on the list extremely difficult. These lists also contain a mixture of business names, individual names, and aliases. In addition, many names originate from foreign countries, which adds even more complexity to the name matching process. For these reasons, among others, determining whether a given name matches a person on a watch list can be extremely difficult. In addition to the risk of failing to identify a terrorist or another name on a watch list, these complexities also result in a large risk of creating false positives. False positives, in turn, may result in offending or denying service to a valuable customer.

For these and other reasons, name recognition and name matching are inherently difficult tasks. Exact string matching is of very limited utility as a match will not be recognized if there is any discrepancy between two names. Other existing name matching solutions are incomplete and of only limited utility in addressing the problem of identifying matching names.

Many relational database systems currently include a "soundex" function for lexically comparing two slightly dissimilar strings. These functions are based on a "Soundex" system that was originally developed a number of years ago as an index filing system for grouping similar sounding names. The initial version of the system was patented by Robert C. Russell in 1918 as U.S. Pat. No. 1,261,167. Russell's system, which became known as "soundex" or "soundexing", used a simple phonetic algorithm to reduce a name to a four character alphanumeric code. The first letter of the code corresponds to the first letter of the last name. The remaining three digits of the code consist of numerals derived from the syllables of the word.

The so-called "American Soundex" system is an improvement on Russell's invention, and was used by the National Archives and Record Administration to index the 1880, 1890, 1900, 1910, and 1920 U.S. Censuses. The Soundex code consists of the first letter of the surname. Then each letter (ignoring punctuation such as spaces and hyphens) is converted to a number as provided in the following table:

Number Letters
1=B F P V
2=C G J K Z S X Z
3=D T
4=L
5=M N
6=R

Four simple rules are then applied. First, vowels ('A', 'E', 'I', 'O', 'U', 'Y') and the letters 'G' and 'H' are not coded—they are ignored. Second, double letters are coded as one letter (e.g., "Williams" has a code of W452). Third, letters of the same code not separated by other letters are coded as one letter (e.g., "Schmidt" has a code of S530). Fourth, the code is truncated if more than four characters long or is padded by adding zeros to the end if less than four characters long (e.g., "Lee" has a code of L000). The resulting 4 character code is the simplified "American Soundex" code for the name.

More recently, many database vendors have implemented variations of the Soundex function for use in database systems as a mechanism for comparing slightly dissimilar strings. Although these Soundex functions enable users to locate information based on phonetic similarities, they are well known to be too coarse for reliable name matching. In addition, various database vendors have slightly different Soundex implementations.

Accordingly, there is a need for a reliable name matching solution that provides for fine-grained analysis of potentially matching names and generates useful results. The present invention provides a solution for these and other needs.

SUMMARY OF INVENTION

A system and methodology for name searches is described. In one embodiment, for example, a method of the present invention is described for determining whether a particular name comprising one or more words matches any names on a list of names. The method comprises steps of: generating codes characterizing the particular name by generating a code for each word of the particular name that is based at least in part on phonetic sounds of the word and on whether characters of the word match a pattern occurring in a proper name in a given natural language; deriving an initial set of any matching names by comparing the codes of the particular name against corresponding codes for the list of names; and deriving a final set of any matching names by comparing words of the particular name against words of names in the initial set.

In another embodiment, for example, a system of the present invention is described for determining whether a particular name comprising one or more words matches any names on a list of names, the system comprises: a code module for generating codes characterizing the particular name by generating a code for each word of the particular name that is based at least in part on phonetic sounds of the word and on whether characters of the word match a pattern occurring in a proper name in a given natural language; a pre-match module for deriving an initial set of any matching names by comparing the codes of the particular name against corresponding codes for the list of names; and a score module for deriving a final set of any matching names by comparing words of the particular name against words of names in the initial set.

In yet another embodiment, for example, a method of the present invention is described for assisting a user in determining whether a particular name having one or more words matches any suspect name on a suspect list, the method comprises steps of: generating a code for each word of the particular name based at least in part on phonetic sound and on patterns of characters occurring in names in natural languages; identifying a set of potentially matching names by comparing codes generated for the particular name with codes generated for suspect names on the suspect list; for each suspect name in the set of potentially matching names, calculating a score based, at least in part, upon correlation of characters between words of the particular name and words of the suspect name; and if the score calculated for the particular name and the suspect name exceeds a threshold, reporting the match to the user.

BRIEF DESCRIPTION OF DRAWINGS

FIG. 5B illustrates a list entry administration interface that can be used to view, modify, or add an entry into a list of names.

FIG. 6 illustrates a suspect search list interface of the system provided in the currently preferred embodiment for initiating a search for a matching name.

FIG. 7 displays an initial portion of the "altCode" method of the Match class.

FIG. 8 displays a series of switch statements in the main loop of the "altCode" method.

FIGS. 9A-9D displays a portion of the "altCode" method that illustrates the handling of the letter 'C'.

FIGS. 10A-10B displays a portion of the "altCode" method that illustrates the handling of the letter 'J'.

FIG. 11 displays the "score" method of the Match class.

DETAILED DESCRIPTION

Glossary

Figure 1:
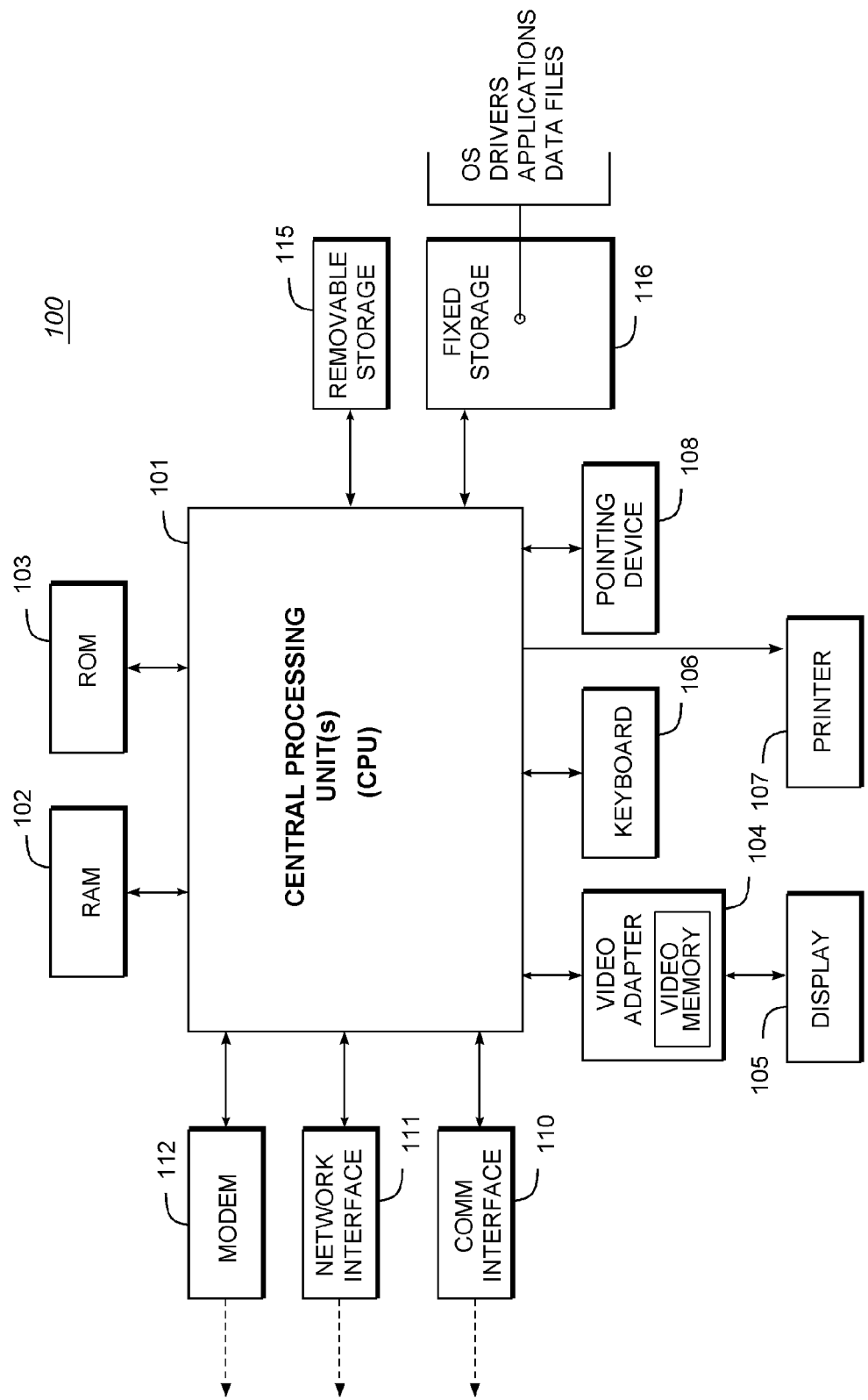
FIG. 1 is a block diagram of a computer system in which software-implemented processes of the present invention may be embodied.

The following definitions are offered for purposes of illustration, not limitation, in order to assist with understanding the discussion that follows.

Java: Java is a general-purpose programming language developed by Sun Microsystems. Java is an object-oriented language similar to C++, but simplified to eliminate language features that cause common programming errors. Java source code files (files with a .java extension) are compiled into a format called bytecode (files with a .class extension), which can then be executed by a Java interpreter. Compiled Java code can run on most computers because Java interpreters and runtime environments, known as Java virtual machines (VMs), exist for most operating systems, including UNIX, the Macintosh OS, and Windows. Bytecode can also be converted directly into machine language instructions by a just-in-time (JIT) compiler. Further description of the Java Language environment can be found in the technical, trade, and patent literature; see e.g., Gosling, J. et al., "The Java Language Environment: A White Paper," Sun Microsystems Computer Company, October 1995, the disclosure of which is hereby incorporated by reference. For additional information on the Java programming language (e.g., version 2), see e.g., "Java 2 SDK, Standard Edition Documentation, version 1.4.1," from Sun Microsystems, the disclosure of which is hereby incorporated by reference. A copy of this documentation is available via the Internet (e.g., currently at java.sun.com/j2se/1.4.1/docs/index.html).

Portal: A portal provides an individualized or personalized view of multiple resources (e.g., Web sites) and services. A portal typically offers a single access point (e.g., browser page) providing access to a range of information and applications. A portal assembles information from a number of different sources (e.g., Web sites and applications) enabling a user to quickly receive information without having to navigate to a number of different Web sites. A portal also typically enables a user to obtain a personalized view of information and applications by organizing and grouping information and services for presentation to users. A portal may be considered to be composed of one or more portlets as defined below.

Portlet: A portlet is an object that is responsible for capturing and delivering information to a portal from a specific source. One or more individual portlets may then be organized on a Web page to create a portal for viewing by users using a browser. Information that may be captured by a portlet may include a Web page or portion of a Web page (e.g., collected from the World Wide Web), data retrieved from a database, flat files (e.g., spreadsheet data and documents), and/or information collected from custom interfaces to applications (e.g., information collected from an application via a Common Gateway Interface). For further information regarding portlets and portals, see e.g., "JSR168: Portlet Specification", the disclosure of which is hereby incorporated by reference. A copy of this specification is available via the Internet (e.g., currently at www.jcp.org).

SQL: SQL stands for Structured Query Language, which has become the standard for relational database access, see e.g., "Information Technology-Database languages-SQL," published by the American National Standards Institute as American National Standard ANSI/ISO/IEC 9075: 1992, the disclosure of which is hereby incorporated by reference. For additional information regarding SQL in database systems, see e.g., Date, C., "An Introduction to Database Systems, Seventh Edition", Addison Wesley, 2000, the disclosure of which is hereby incorporated by reference.

Introduction

Referring to the figures, exemplary embodiments of the invention will now be described. The following description will focus on the presently preferred embodiment of the present invention, which is implemented in desktop and/or server software (e.g., driver, application, or the like) operating in an Internet-connected environment running under an operating system, such as the Microsoft Windows operating system. The present invention, however, is not limited to any one particular application or any particular environment. Instead, those skilled in the art will find that the system and methods of the present invention may be advantageously embodied on a variety of different platforms, including Macintosh, Linux, Solaris, UNIX, FreeBSD, and the like. Therefore, the description of the exemplary embodiments that follows is for purposes of illustration and not limitation. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware or combinations thereof.

Computer-Based Implementation

Basic System Hardware (e.g., for Desktop and Server Computers)

The present invention may be implemented on a conventional or general-purpose computer system, such as an IBM-compatible personal computer (PC) or server computer. FIG. 1 is a very general block diagram of an IBM-compatible system 100. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real time system clock is included with the system 100, in a conventional manner.

CPU 101 comprises a processor of the Intel Pentium family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP Laserjet printer (available from Hewlett Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Hewlett-Packard of Palo Alto, Calif., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

Basic System Software

Figure 2:
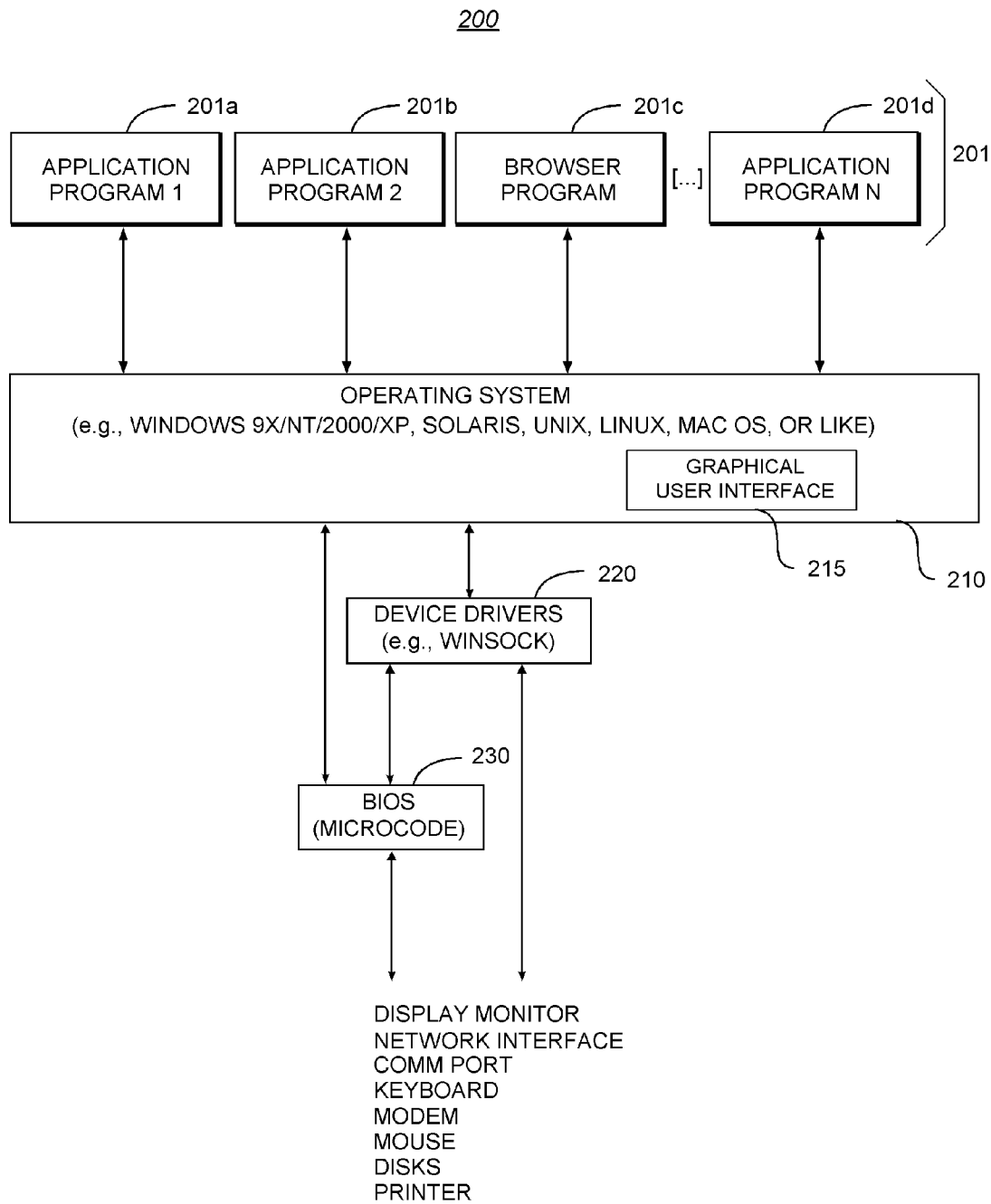
FIG. 2 is a block diagram of a software system for controlling the operation of the computer system.

Illustrated in FIG. 2, a computer software system 200 is provided for directing the operation of the computer system 100. Software system 200, which is stored in system memory (RAM) 102 and on fixed storage (e.g., hard disk) 116, includes a kernel or operating system (OS) 210. The OS 210 manages low-level aspects of computer operation, including managing execution of processes, memory allocation, file input and output (I/O), and device I/O. One or more application programs, such as client application software or "programs" 201 (e.g., 201a, 201b, 201c, 201d) may be "loaded" (i.e., transferred from fixed storage 116 into memory 102) for execution by the system 100. The applications or other software intended for use on the computer system 100 may also be stored as a set of downloadable computer-executable instructions, for example, for downloading and installation from an Internet location (e.g., Web server).

Software system 200 includes a graphical user interface (GUI) 215, for receiving user commands and data in a graphical (e.g., "point-and-click") fashion. These inputs, in turn, may be acted upon by the system 100 in accordance with instructions from operating system 210, and/or client application module(s) 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver—Windows' implementation of a TCP/IP stack) and the system BIOS microcode 230 (i.e., ROM-based microcode), particularly when interfacing with peripheral devices. OS 210 can be provided by a conventional operating system, such as Microsoft Windows 9x, Microsoft Windows NT, Microsoft Windows 2000, or Microsoft Windows XP, all available from Microsoft Corporation of Redmond, Wash. Alternatively, OS 210 can also be an alternative operating system, such as the previously mentioned operating systems.

The above-described computer hardware and software are presented for purposes of illustrating the basic underlying desktop and server computer components that may be employed for implementing the present invention. For purposes of discussion, the following description will present examples in which it will be assumed that there exists a "server" (e.g., Web server) that communicates with one or more "clients" (e.g., desktop computers). The present invention, however, is not limited to any particular environment or device configuration. In particular, a client/server distinction is not necessary to the invention, but is used to provide a framework for discussion. Instead, the present invention may be implemented in any type of system architecture or processing environment capable of supporting the methodologies of the present invention presented in detail below.

Overview of System and Methodology for Name Searches

The present invention comprises a system providing improved methods for identifying matching or potentially matching names based on configurable search criteria. In one embodiment, a search engine system of the present invention checks for names that may match names on a particular suspect (or watch) list. The system includes intelligence that will suggest matching names even if the names have been deliberately changed, translated, truncated, or otherwise disguised. A "fuzzy", pattern-matching methodology is used in which specified values (e.g., names) are evaluated to determine whether they match values stored in lists (e.g., suspect lists). Based on this evaluation, the system determines a "score" (or "hit score"). In the currently preferred embodiment, this score is a percentage that represents the degree of similarity between the compared names or values. Names that are more similar to each other result in a higher percentage score. The system reports transactions above a pre-selected score threshold as a potential match. A user may then further investigate the names and/or transactions in more detail.

In one embodiment, the system is implemented as a component of an end-to-end solution for financial institutions. The search engine system is part of a solution that enables financial institutions to automate identity verification, name filtering, intra-day and historical transaction filtering, and enterprise-wide customer activity monitoring as required by the recent USA PATRIOT Act ("Uniting and Strengthening America by Providing Appropriate Tools Required to Intercept and Obstruct Terrorism") legislation. Customer and employee records can be checked using the solution for compliance and suspect filtering. The suspect lists consulted by the system are usually a combination of US Government lists and a financial institution's own lists. US Government lists can be downloaded and integrated into the system on a scheduled basis. The financial institution can create, add and maintain the lists using the system of the present invention as hereinafter described. Audit trails and monitoring are also provided to allow the compliance officers to show the effectiveness of the system.

Besides the above-described use of the system for searching for matching names in order to identify terrorists or suspicious activities, there are a number of other situations where the system and methodology of the present invention may be effectively utilized. A telephone directory search where a user does not know the exact spelling of a person's name is an example of another application in which this name search system and methodology of the present invention may be effectively utilized. The present invention may also be used for voter list screening (e.g., to eliminate ineligible voters from a registry) as well as airport passenger screening (e.g., to bar certain people with a known history of "air rage" attacks or who are suspected terrorists from boarding flights). The name search capabilities of the present invention may also be useful in other applications, including "spam" filtering (e.g., to eliminate emails originating from certain names), and credit verification (e.g., to verify that a new customer is not known under another name or variation of a name to have debt accumulation or bankruptcy problems).

Experience to date indicates that the solution yields much better results in performing name searches than existing search engines (e.g., Google or Autonomy) or the familiar "soundex" comparison algorithm, and that the solution is useful in a number of different applications. The components of the currently preferred embodiment and their operations will now be described.

System Components

Figure 3:
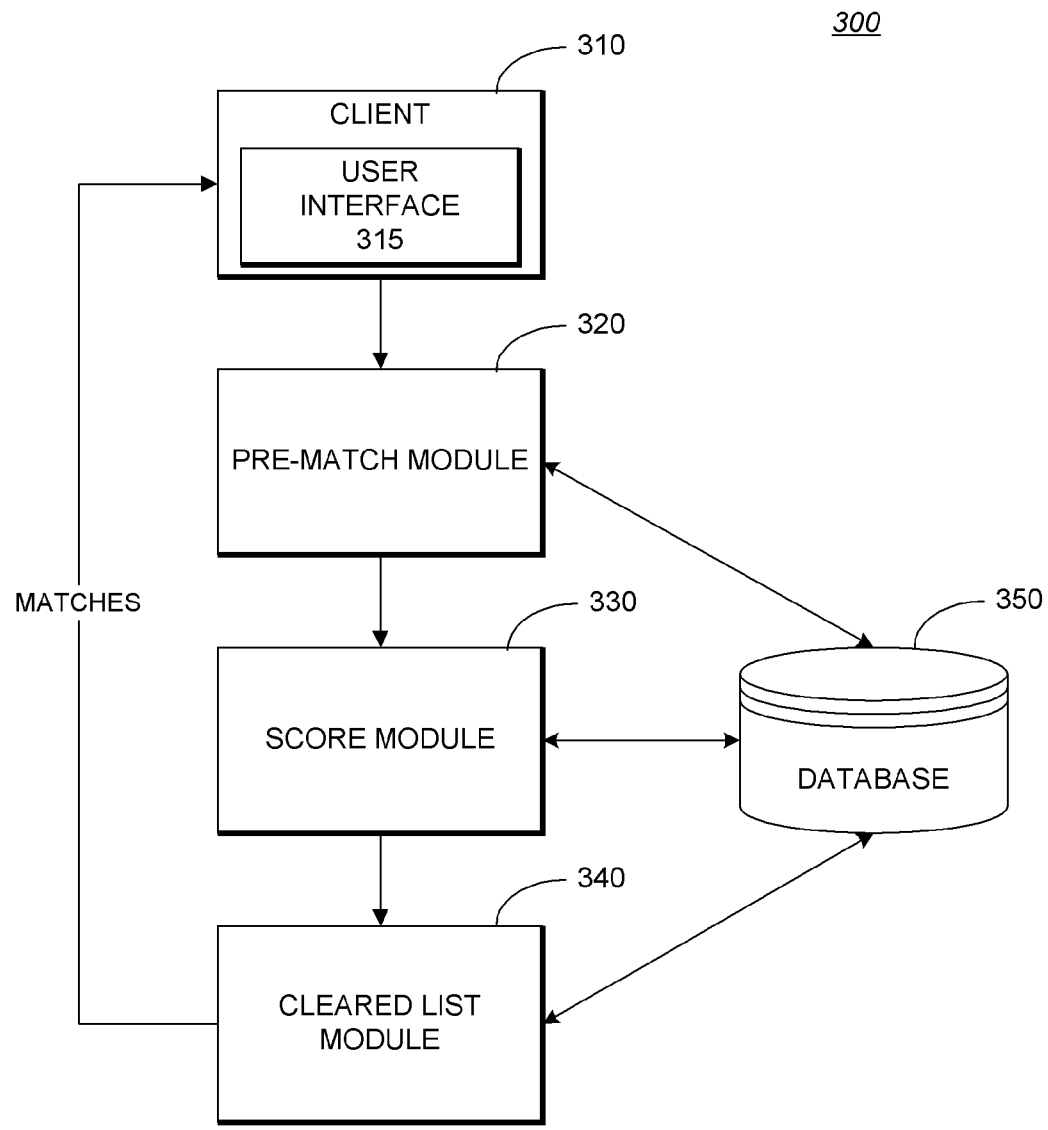
FIG. 3 is a high-level block diagram illustrating the components of the currently preferred embodiment of the system of the present invention and the high-level flow of data among components of the system.

FIG. 3 is a high-level block diagram illustrating the components of the currently preferred embodiment of the search engine system 300 of the present invention. FIG. 3 also illustrates the high-level flow of data among components of the system during the process of conducting a search. As shown, the system includes a client 310 having a user interface 315, a pre-match (code) module 320, a score module 330, a cleared list module 340, and a database 350. The following discussion will describe these modules and illustrate the high-level flow of data among these components for conducting a search to determine if a particular name matches a name on a particular list of suspects.

The client 310 includes user interface (e.g., web interface) 315 enabling a user to access the name search and name match features of the system (e.g., from a web browser). The user interface 315 may be used to set searching or filtering parameters, administer lists of suspects and cleared names, and various other tasks. The client 310 may also use the user interface 315 initiate a search for a match for a particular name. For example, the client may submit a name to determine if the submitted name matches a name on a watch list of suspected terrorists and their sympathizers.

Alternatively, the name to be checked may be provided by an application program (e.g., a financial or business application performing transactions which include individual and/or company names). For example, transaction messages may be submitted in a batch-load process (e.g., through use of a message queuing system). Transactions submitted in this fashion are typically pre-processed (e.g., to include batch number, company identifier and entry date from the batch header record for auditing and filtering purposes). The transaction messages are then converted into a standard XML format. After the message is converted into a standard format, it can be filtered (i.e., searched) as described below.

Irrespective of the manner in which a name is submitted, when a submitted name is received by the pre-match module 320 it is initially processed to generate a "code". The pre-match module 320 provides capabilities to dissect a name into a "code" representing the most basic sound and spelling of the name. The process of generating a code for the submitted name includes removing superfluous letters and equating like sounding letters to generate a shortened version or "code" of each of the words of the submitted name. The code is phonetically similar to the original word and can be considered as an index to the word.

The pre-match module 320 then makes an initial determination as to whether the submitted name is a potential match for one or more of the names on the suspect list. As described below in greater detail, the pre-match module determines whether the code of any word of the submitted name matches a code of any name on the suspect list. The list of suspect names and associated codes may be maintained in the database 350 or in another form of storage. If there is a match (referred to herein as a "pre-match") between any code of the submitted name and a code of a suspect named on the suspect list, the submitted name and suspect name are evaluated by the score module 330. A submitted name may "pre-match" more than one name in which case scores may be calculated for several potentially matching names.

The score module 330 calculates the degree of similarity (or matching) between names as a percentage. For example, if the pre-match module 320 identifies a suspect name that potentially matches (or "pre-matches") the submitted name, the score module 330 receives the two names as input and generates a score value (e.g., as a percentage) representing the degree of similarity between the two names. The score module 330 determines the percentage likeness between two names. For example, the score module 330 may determine that the name "Homer Simpson" is a 91.45% match of the name "Homer Cimpson". The score module then evaluates whether this score (i.e., this percentage) exceeds an established reporting threshold. The score module 330 may be adjusted to provide for more (or less) stringent search and reporting criteria. For example, one user may wish to only be advised of names that are at least a 90% match, while another user may wish to apply a different standard. The system typically reports the possible match and/or takes other action if the score exceeds an established threshold.

The cleared list module 340 is an optional enhancement which is provided as a convenience to enable certain known matches to be eliminated from consideration. In any given application (e.g., a banking application or airline reservation system) it may be necessary to eliminate some names from a result set so that names do not continue to appear repeatedly as matches. For example, a well known bank customer with a certain account number may have exactly the same name as that of a person on the watch list. In this circumstance an account number or another identifier associated with the bank customer may enable the cleared list module to determine that in this particular instance the two names that are being compared do not really the represent the same person. The cleared list module can be used to avoid repeated investigation of the same individual or entity.

The database 350 (which may represent one database or a plurality of databases) provides database support to the system, storing lists of suspect names, cleared lists, codes, scores, and other related information. The codes and scores determined by the system of the present invention can be embedded in the database 350 and available in response to Structured Query Language (SQL) queries. The system also includes an extraction feature (not separately shown at FIG. 3) providing the ability to extract names from within longer strings of text.

After the above process of examining a particular name or set of names is completed, any matching names with scores exceeding the reporting threshold and which are not on the cleared list are returned to the client 310 (e.g., for display in the client user interface). The user may then take further action (e.g., further investigate the report) to determine whether or not the submitted name(s) does, in fact, correspond to a person on the suspect (or watch) list.

It should be noted that a number of the the above modules or features may be used separately as well as in combination. For example, in an alternative embodiment the code module is implemented as a separate module rather than as a part of the pre-match module. A thorough word recognition package specifically geared to the problem of recognizing names can be provided by combining the pre-match and score modules. However, the pre-match and score modules can also be used separately. For example, either the pre-match module (including the code functionality) or the score module can be used as a standalone product. Alternatively, these modules can be used outside the balance of the system as a toolkit for development of custom searching applications.

Detailed Operations

Process of Checking for a Name Match

Figure 4A:
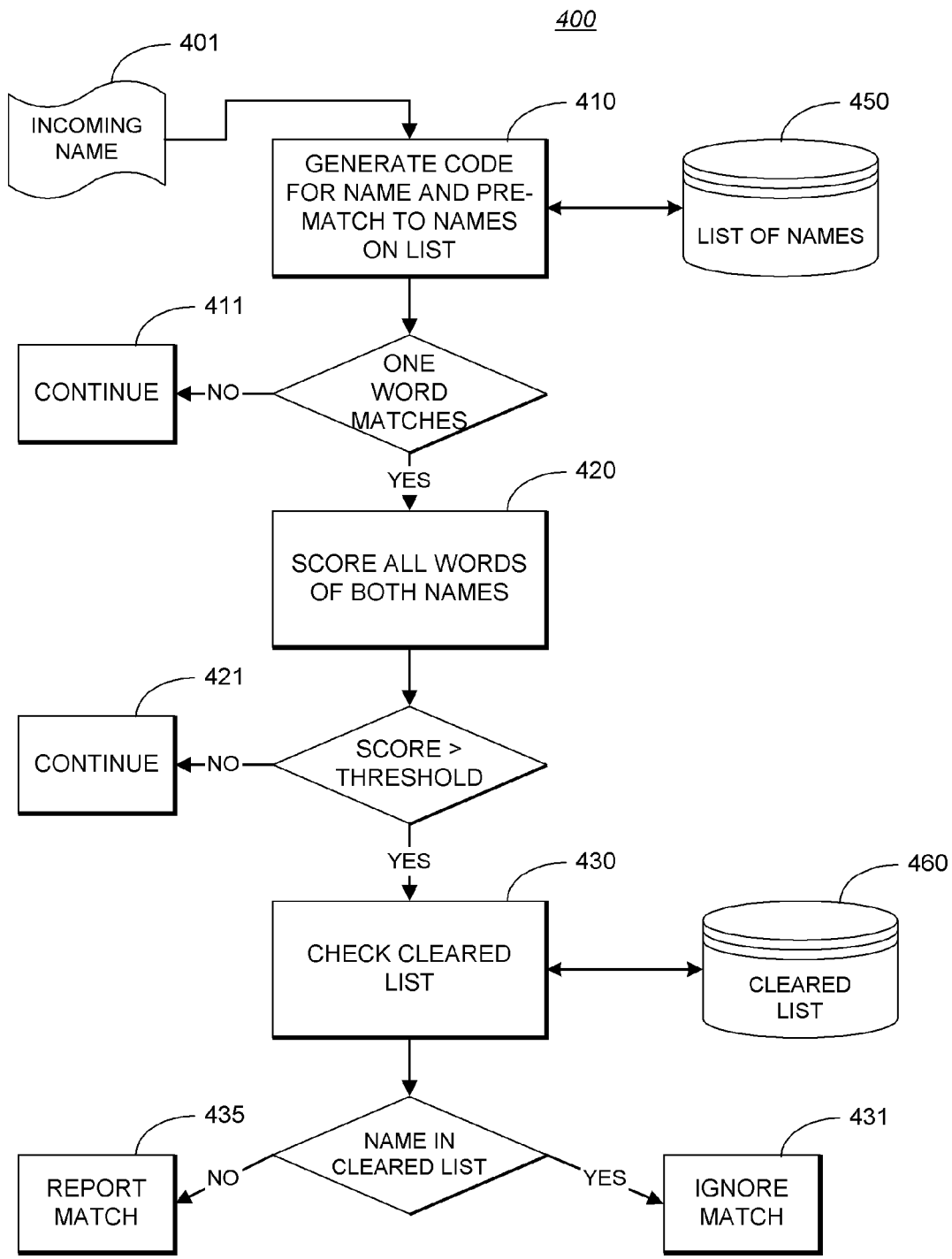
FIG. 4A is a flow diagram illustrating in greater detail the process of checking for a name match in the search engine system of the currently preferred embodiment.

FIG. 4A is a flow diagram 400 illustrating in greater detail the process of checking for a name match in the search engine system of the currently preferred embodiment. As shown, when an incoming name 401 is received, the name is initially processed by the pre-match module to generate a code for each word of the name as shown at block 410. The pre-match module also determines if at least one word of the incoming name matches a word of a name on the list(s) of names 450. The list of names 450 may, for instance, comprise a list of known terrorists and their sympathizers which is maintained in a relational database. In the presently preferred embodiment, if the code for at least one word of the submitted name matches the code for one word of a name on the list of names 450, the process proceeds to block 420 to examine the incoming name and the pre-matched name(s) from the list of names (e.g., list of suspects) in more detail. Otherwise, if at least one word of the incoming name does not match one word of the name on the list, the system continues as shown at block 411. In this event the system may proceed to examine another incoming name.

If one word of the name "pre-matches" a name on the list of suspects at block 410, then at block 420 a score is calculated based on all of the words of both names (i.e., the complete incoming name and a complete "candidate" or "suspect" name identified at block 410). It should be noted that more than one potentially matching suspect name may be examined in the event that more than one name on the list is pre-matched at block 410. The manner of calculating the score is described below in this document. In the currently preferred embodiment, the score is calculated as a percentage, with 100 percent being an exact match between names. The codes and calculated scores can also be stored in a database, as desired.

After the score has been calculated for an incoming name and a candidate name, the calculated score is compared to an established reporting threshold. If the score exceeds the established threshold, the process proceeds to block 430. Otherwise, if the score is less than the threshold, the process continues at block 421 with examining another candidate name while candidate (suspect) names remain to be compared. Otherwise, if all candidate names have been compared, additional incoming names may be examined.

If the score calculated based on a given candidate name and an incoming name exceeds the reporting threshold at block 420, then an (optional) check is made at block 430 to determine if the incoming name is on a cleared list 460. If the incoming name is determined to be on the cleared list 460 (e.g., based on a unique identifier associated with the incoming name), then the match with the candidate name is ignored at block 431. However, if the incoming name is determined not to be on the cleared list at block 430, then the match is reported (e.g., to a user in the client user interface of the system) as illustrated at block 435. Additional information (e.g., the candidate matching name and the score) may also be reported at this point and/or otherwise made available to allow further examination of the incoming name and the candidate name. The operations of each of the modules will now be described in more detail.

Pre-Match (Code) Module

Figure 4B:
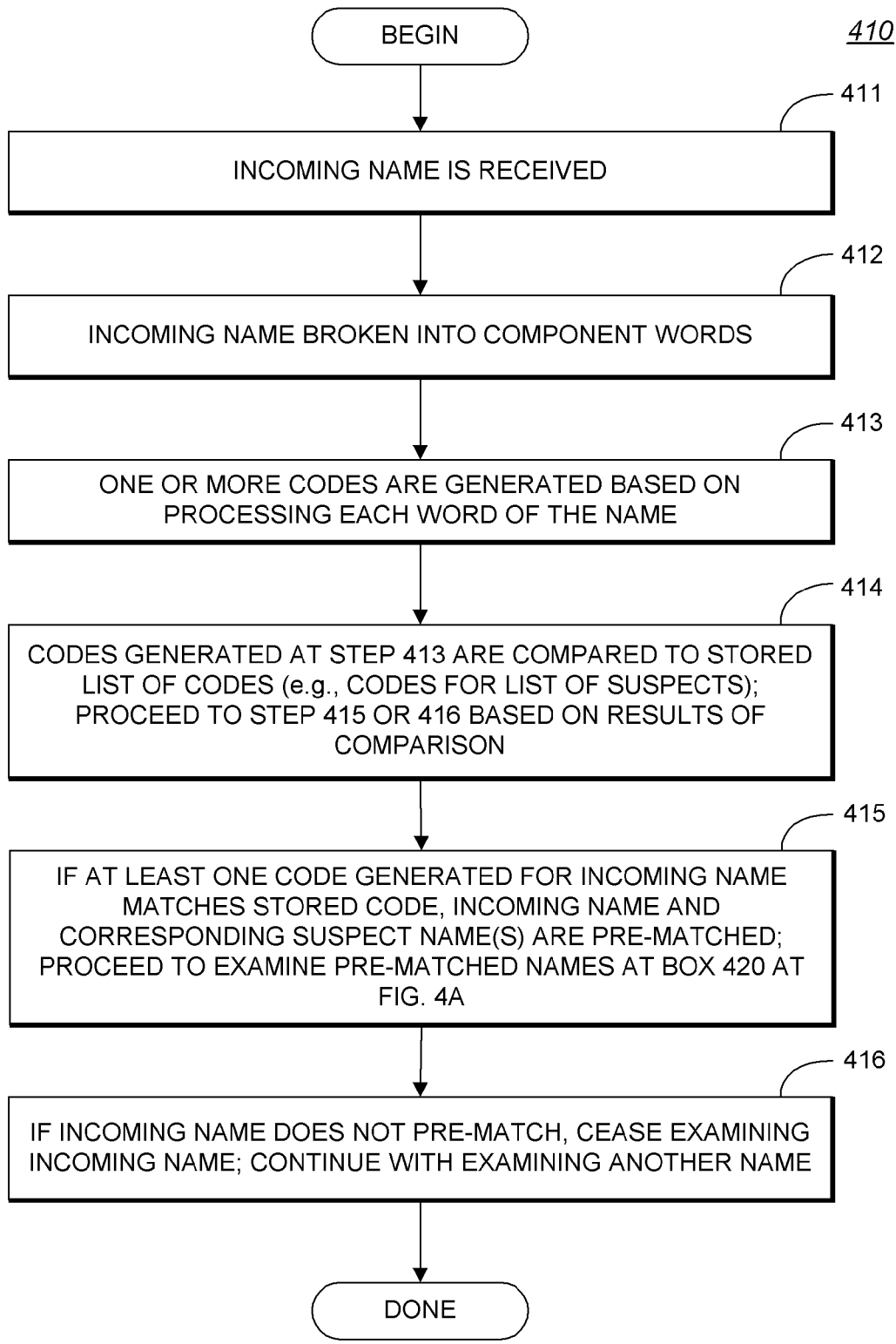
FIG. 4B is a flowchart illustrating in further detail the processing of a given name by the pre-match module.

FIG. 4B is a flowchart 410 (corresponding to block 410 at FIG. 4A) illustrating in further detail the processing of a given name by the pre-match module. As shown, at step 411 the pre-match module receives an incoming name. The particular incoming name that is being examined may, for example, include a first name and a last name (or surname). At step 412, the incoming name is broken into its component words. This can be performed by parsing the string containing the incoming name (e.g., using a Java "StringTokenizer" method or a similar function). Alternatively, the name may already be broken into component words (e.g., in the event a first name and a last name were entered into separate fields of an input form).

Next, at step 413 each word of the incoming name is processed to generate at least one "code" for the word. In the presently preferred embodiment, two codes are generated for each word of a name as some words may have more than one common pronunciation or phonetic sound. However, in many cases the codes are identical (i.e., when the word does not have common alternative pronunciations). After the codes for each word of the name have been generated, at step 414 the codes generated at step 413 are compared to a stored list of codes that have been previously generated for each suspect on a suspect list maintained by the system. The stored list may, for example, include several hundred codes that have been generated in advance based on names of known terrorists and their sympathizers. The comparison performed at this step involves looking for a match between one of the codes generated based on the incoming name and one code based on a name on the suspect list. Based on this comparison the method proceeds to step 415 or 416.

If at least one code for the incoming name matches a code based on a name on the suspect list, then at step 415 the incoming name is considered to be "pre-matched" to the corresponding name on the suspect list. It should be noted that the incoming name may, in fact, "pre-match" to several candidate names on the suspect list. In this event, the method proceeds to block 420 as shown at FIG. 4A to further examine each set of pre-matched names (i.e., the incoming name and one or more candidate names from the suspect list). Otherwise, if the comparison at step 414 determines that none of the codes generated based on the name "pre-matches" any of the codes of the suspect list, the method proceeds to step 416. In this case, an incoming name that does not "pre-match" is not considered any further and the system may continue with the examination of another incoming name. Some examples will now be used to illustrate the operations of the pre-match module.

When an incoming name is received (e.g., from a dispatcher, bulk searcher, or nightly filter, or entered by a user in a user interface of the system), a code value (or values) is generated for every word in the name. The pre-match module then retrieves all the candidate names from a list of candidates (e.g., from a "PatQuickMatch" table of a supporting database) where at least one word in the candidate name matches one word in the incoming name. For example, an inbound financial transaction may have a sender named "Frank Armani". That name will pre-match to the name "Dino Armani". Similarly an incoming name of "Dino Simpson" will also pre-match to "Dino Armani".

All that is required for names to "pre-match" is for the code value of one word in the incoming name to match the code value of one word in the suspect (or candidate) name. Also, because the code evaluation method is clever enough to smooth out misspellings, disguises, and translations, like sounding names will also match. For example, "Frank Armane" or "Dina Simpson" will both pre-match to "Dino Armani". Because of this approach, incoming names will frequently "pre-match" a list of candidate (suspect) names if the list of names has, for example, over five thousand names and aliases. For instance, every incoming name that includes the word "John" may pre-match to several candidate names including, for example, "Abbott, John G". In addition, because the code methodology of the present invention is "fuzzy", any name including the word "Jhon" will also pre-match to the candidate name "Abbott, John G".

The pre-match (or code) module processes names into a form that removes superfluous letters. Like sounding letters, such as "d" and "t" are equated, with the result being a shorted version of the word that is phonetically the same as (or similar to) the original word. For example, the following illustrates an example of the code for the name Dino, Armani:

name word code
ARMANI, DINO ARMANI ARMN
ARMANI, DINO DINO TN

In this case, one code "ARMN" represents the word "ARMANI" and a second code "TN" represents the word "DINO". Basically, the code module shortens a word to the word's most "guttural" sound. For approximately twenty percent of all words, one code is not considered sufficient to define the word and an alternative code is also generated. For example, a forename "Nikolaus" has a code value of "NKL" as well as an alternative code value of "NKLS".

The code that is generated can be considered as an index to the word. These codes are utilized by the system of the present invention for comparing names. When applied to two names (e.g., an incoming name being checked and a candidate name from a list of "suspects"), the use of these codes allows the two names to be compared and equated even though they two may fail direct string comparison.

The methodology of the present invention is sensitive to combinations of letters that together may sound different and differences in languages are supported. Name equivalents as well as language translations are also supported. For example, name equivalence includes equating the names Bill and William. The language translation capability enables translations of the same name such as Anne and Hanna to also be identified.

In one embodiment, codes for words of candidate (suspect) names in the list are maintained in a "PatQuickMatch" table. The values in the "PatQuickMatch" table are refreshed by a "SuspectCreate" module and also from a component (application) maintaining suspect lists. The following illustrates an example of a "PatQuickMatch" table entry for the name "Dino Armani":

select name, quickname, code
from PatQuickMatch
where name='ARMANI, DINO'
go
name, quickname code
ARMANI, DINO ARMANI ARMN
ARMANI, DINO DINO TN
(2 rows affected)

It should be noted that one incoming name can create multiple pre-matches if the incoming name matches to more than one distinct suspect (candidate) name. For example, the name "Ben Laden" may create a pre-match with "Osama Bin Laden", with "Bin Ladin, Usama bin Muhammad bin Awad", and with "Usama Bin Laden Organization". The process of generating codes for a given name will now be described in greater detail.

In generating a code for a given name, an "altCode" method of a Match class is called to generate a code for each word of a given name (e.g., first name, middle name, and/or last name). For each word, this method applies some phonetic rules in order to produce one (or in some cases two) abbreviated version(s) of the word that generally represent the "guttural" sound of the word. In some cases, a given word of a name may not have only one possible pronunciation. Various factors, including the language of origin of the word, may influence the pronunciation of the word when it is spoken. Accordingly, the approach of the present invention provides for generating two codes based on the input of one word. This approach is used to enable codes representing possible alternative pronunciations to be captured for words that are known to be pronounced in two different ways. However, it should be noted that in many cases the same code is returned twice for words that do not have alternative sounds or pronunciations.

The following "altCodeV" method is initially invoked for generating codes:

```
1:  public static Vector altCodeV(String arg)
2:  {
3:      Vector returnV = new Vector( );
4:      String[ ] retValues = altCode(arg);
5:      returnV.add(0,retValues[0]);
6:      returnV.add(1,retValues[1]);
7:      return returnV;
8:  }
```

As shown above at line 4, the above "altCodeV" method calls the "altCode" method described below which is the routine that processes words and generates codes. The "AltCodeV" method converts the String values returned by the "altCode" method into Vectors.

FIG. 7 displays an initial portion of the "altCode" method of the Match class:

```
1:      public static String[ ] altCode(String arg)
2:      {
3:        int current = 0;
4:        int len = arg.length( );
5:        int last = len − 1;//zero based index
6:        //String      primary, secondary;
7:
8:        String[ ] retValues = new String[2];
9:        //Vector returnV = new Vector( );
10:       for (int i=0;i<retValues.length;i++){retValues[i] = " ";}
11:
12:       if (len < 1)
13:       {
14: //        returnV.add(0,retValues[0]);
15: //        returnV.add(1,retValues[1]);
16:         return retValues;
17:       }
18:       boolean alternate = false;
19:       arg = arg.toUpperCase( );
20:       //pad the original string so that we can index beyond the
          edge of the world
21:       arg += " ";
22:
23:       //skip these when at start of word: "GN", "KN", "PN", "WR", "PS"
24:       if (StringAt(0, arg,WORD_START_SKIP_1))
25:         {current += 1;}
26:
27:       //Initial 'X' is pronounced 'Z' e.g. 'Xavier'
28:       if (arg.charAt(0) == 'X')
29:       {
30:         retValues[0] += "S";//'Z' maps to 'S'
31:         retValues[1] += "S";//'Z' maps to 'S'
32:         current += 1;
33:       }
34: //continued
```

As illustrated at line 1 of FIG. 7, the "altCode" method receives a String argument (e.g., a word of a name) as input and returns a String array containing the codes generated by the method. At line 8, a String array "retValues" having two members is created for returning the codes generated by this method. Some initial processing of the input is then performed. For example, some padding is added at line 21 to facilitate the examination of characters at the end of the string. Also, at lines 24-25 a check is made for particular characters at the start of a word (e.g., "GN", "KN", "PN", "WR", and "PS"). As these characters are typically not pronounced when found at the start of the word, these characters, if found at the start of a word, are essentially skipped in generating the code(s) for the word. Next, another check is made at line 28 to determine if the word starts with the letter 'X'. If so, this is mapped to a value of S'.

After this initial process, the "altCode" method enters its main processing loop. The main loop comprises a lengthy series of switch statements for processing characters of the word which commences as shown in FIG. 8.:

```
35:     /////////main loop///////////////////////
36:     while(current < len)
37:     {
38:       switch(arg.charAt(current))
39:       {
40:         case 'A':
41:         case 'E':
```

```
42:         case 'I':
43:         case 'O':
44:         case 'U':
45:         case 'Y':
46:           if (current == 0)
47:           {
48:             //all init vowels now map to 'A'
49:             retValues[0] += "A";
50:             retValues[1] += "A";
51:           }
52:           current += 1;
53:           break;
54:
55:         case 'B':
56:           //"-mb", e.g", "dumb", already skipped over...
57:           retValues[0] += "P";
58:           retValues[1] += "P";
59:           if (arg.charAt(current + 1) == 'B')
60:             {current +=2;}
61:           else
62:             {current +=1;}
63:           break;
64: // ...
```

As illustrated in FIG. 8, the method proceeds to process the input argument (i.e., a word of a name) position by position to examine each component of the word. Although the processing generally proceeds position by position, the method also moves forward and backward in the input String to examine other characters in order to enable the character at the current position to be examined in context.

The switch statement commencing at line 38 includes a long series of conditional statements for examining the current character (i.e., the character at the current position in the word that is being processed) and applying rules that are largely based on phonetics (i.e., the sound of the word or a syllable included as part of the word) in generating a code for the word. For example, as illustrated above at lines 40-53, the vowel characters 'A', 'E', 'I', 'O', 'U', and 'Y' are generally ignored in generating a code unless these characters are at the start of the word. If these vowels are at the start of the word, then an initial character 'A' is mapped to the first position of the two return values arrays as provided at lines 46-51. As a result, most vowel characters are usually removed when a code is generated for a given word.

The method then continues with a set of conditions for evaluating other characters and combinations of characters. The method looks for patterns which often occur with names in particular natural languages (or based on particular nationalities). It is designed to be language sensitive by looking for certain combinations of letters (characters), as such combinations may indicate that a name is in a particular natural language (e.g., Russian, Polish, Italian, Spanish, English, or another natural language). Several examples will be described to illustrate the methodology of the present invention for generating a code for a given word.

For example, the portion of the "altCode" method shown in FIGS. 9A-D illustrates the handling of the letter 'C' when it is encountered in processing a word.

The segment of the "altCode" method generally handles the character 'C' when it is found at the current position in the input array (i.e., word) that is being processed. As illustrated, the character 'C' is not simply equated with a single character in deriving the code for the word. Instead, the surrounding context (i.e., other characters in the word) are examined in an attempt to accurately capture the likely sound of a syllable or other portion of the word and then to generate code value(s) that correspond to this sound. For example, assuming that the current character is a 'C', the code at lines 48-57 looks to see if the character following the 'C' is an 'H'. If so, a check is made to look for the Greek root sound "CH" as in the words "chemistry" or "chorus". If this evaluation indicates the word contains (or likely contains) this phonetic sound, then the character 'K' is stored in both return value strings, the next character (i.e., the 'H' following the 'C' at the current position) is skipped ("current +=2"), and the method proceeds to evaluate the following character in the word (if any).

In another case, however, the character following the 'C' might be a 'Z'. If so, the code at lines 97-105 attempts to determine if this sounds like "CZ" as in the word "Czerny". If this evaluation returns a result of "true", then the values 'S' and 'X' are stored in the return value String arrays. Also note that in this case the "alternate" variable is set to "true" at line 101 indicating that the word being processed has two possible pronunciations (and therefore two different codes) that should be considered. The two different values correspond to the two possible sounds that are likely based on the combination of characters in the word. As another alternative, the word may include the character 'M' before the 'C'. This is tested as shown at line 74 to determine if the word includes the sound "MC" as in the word "McHugh". If so, the value of 'K' is stored in both arrays as provided at lines 77-78. Also notice that because in this case the same value is entered in both String arrays, the "alternate" variable is not set to true in this segment of the code. As illustrated above, characters before and after the current position in the word are examined to attempt to match patterns that may occur for names in particular languages or names having certain national origins.

Another example is the handling of the letter 'J' as illustrated by the following portion of the "altCode" method shown in FIGS. 10A-10B.:

```
1:       case 'J':
2:           //obvious spanish, 'jose', 'san jacinto'
3:           if (StringAt(current, arg, "JOSE") ||
StringAt(0, arg, "SAN ") )
4:           {
5:               if (((current == 0) && (arg.charAt(current
+ 4) == ' '))
6:               || StringAt(0, arg, "SAN") )
7:               {
8:                 retValues[0] += "H";
9:                 retValues[1] += "H";
10:              }
11:              else
12:              {
13:                  retValues[0] += "J";
14:                  alternate = true;
15:                  retValues[1] += "H";
16:              }
17:              current += 1;
18:              break;
19:          }
20:
21:          if ((current == 0) && !StringAt(current, arg,
"JOSE"))
22:          {
23:              retValues[0] += "J";
24:              alternate = true;
25:              retValues[1] +=
"A";//Yankelovich/Jankelowicz
26:          }
27:          else
28:          {
29:              //spanish pron. of e.g. 'bajador'
30:              if (isVowel(current − 1,arg)
31:                  && !slavoGermanic(arg)
32:                  && ((arg.charAt(current + 1) == 'A')
||
(arg.charAt(current + 1) == 'O')))
33:              {
34:                  retValues[0] += "J";
35:                  alternate = true;
36:                  retValues[1] += "H";
37:              }
38:              else
39:              {
40:                  if (current == last)
41:                  {
42:                      retValues[0] += "J";
43:                      alternate = true;
44:                  }
45:                  else
46:                  {
47:                      if (!StringAt((current + 1), arg,
J_LTKSNMBZ)
48:                          && !StringAt((current − 1),
arg, J_SKL))
49:                      {
50:                          retValues[0] += "J";
51:                          retValues[1] += "J";
52:                      }
53:                  }
54:              }
55:          }
56:          if (arg.charAt(current + 1) == 'J')//it could
happen!
57:              {current += 2;}
58:          else
59:              {current += 1;}
60:          break;
```

As provided at line 3, a check is made to determine if the word that includes the letter 'J' at the current position includes other characters indicating the word is likely to be of Spanish origin (e.g., "Jose" or "San Jacinto"). If so, a further evaluation is made as provided at lines 5-6. If the result of the evaluation performed at lines 5-6 returns "true", then the value 'H' is stored in both arrays as provided at lines 8-9. Otherwise, if the result is "false" thevalue 'J' is stored in the first result array, and the value 'H' is stored in the second as provided at lines 13-15. In this later case, the "alternate" variable is also set to "true" indicating that different values were stored in the two result arrays. However, if the initial condition at line 3 is false (i.e., the word does not include "Jose" or "San"), then the remainder of the above portion of the method looks for other patterns that may result in the system generating other values for inclusion in the code(s).

After the codes have been generated for an incoming name, these codes are evaluated against codes previously generated for names on a suspect list. For example, four codes are generated by the above method for a name that has two words (a first name and a last name). These four codes are then compared to the codes previously generated for names on the suspect list. Each name on the suspect list having a code(s) that matches at least one of the four codes generated for this incoming name is considered to be "pre-matched" to the incoming name. A score is then calculated for each set of pre-matched names as described in the following discussion.

Score Module

The score module addresses the problem of eliminating potential matches in an intelligent fashion. The typical problem in name searching and matching is not in finding potential matches, but rather in effectively eliminating potential matches. This area is where the score methodology of the present invention is particularly useful. The score module takes the pre-matched names and subjects them to a completely different matching criteria, one that is character based (i.e., that has no notion of phonetics), and which produces a score of how close two words or names are to one another. The score module returns a percentage likeness (similarity)

between two names. It should be noted that the score is calculated by the system as a value between zero and one thousand, and that this value is normalized to a value between zero and one hundred in the output of the search engine. In other words, the value reported to the user is a value between zero and 100 representing the degree of similarity between the two names.

Figure 4C:
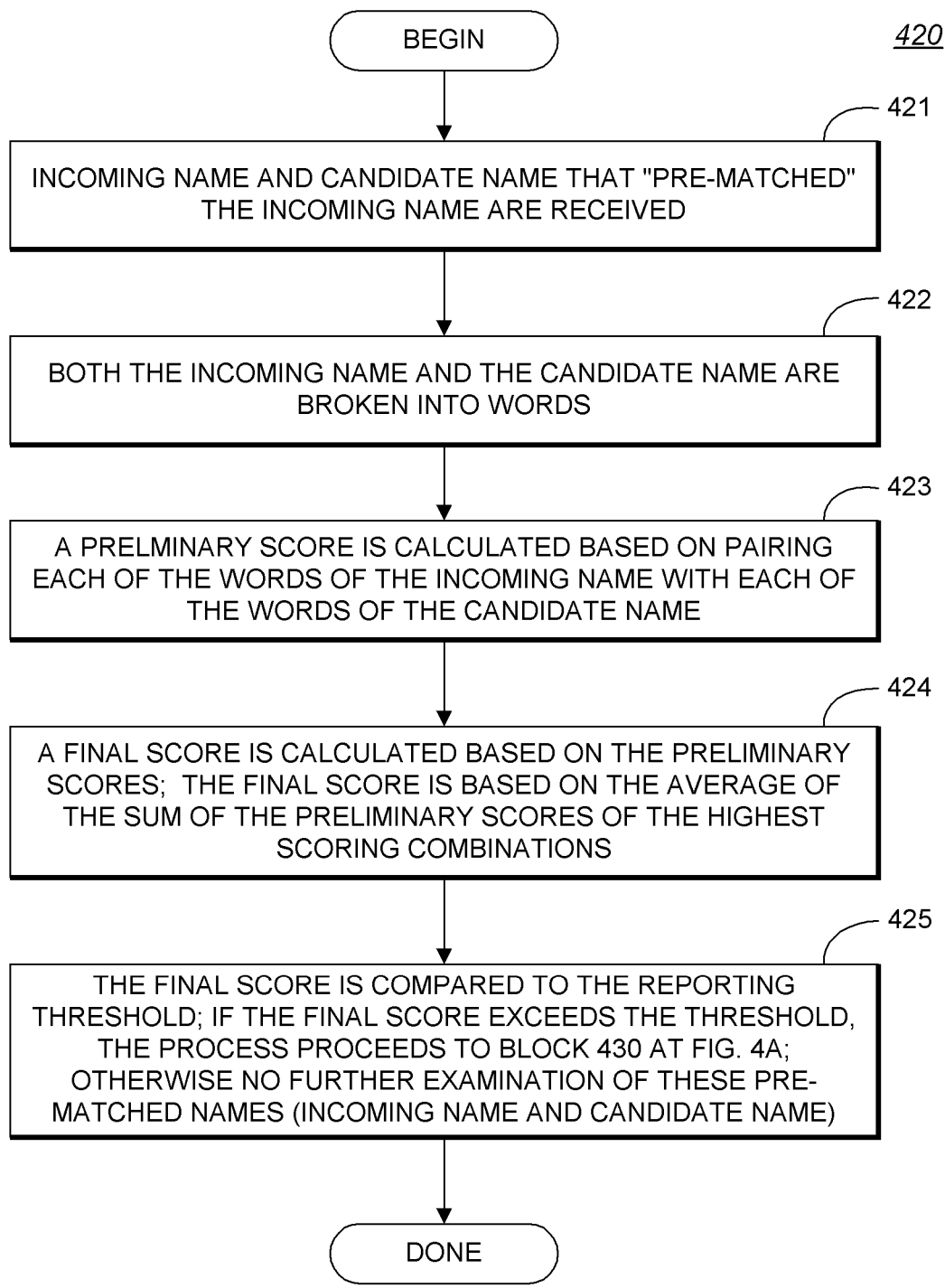
FIG. 4C is a flowchart illustrating in further detail the process of calculating a score based on a given input name and a candidate matching name by the score module.

FIG. 4C is a flowchart 420 (corresponding to block 420 at FIG. 4A) illustrating in further detail the process of calculating a score based on a given input (or incoming) name and a candidate matching name by the score module. As shown, at step 421 an input (or incoming) name and a candidate name that "pre-matched" the incoming name are received. At step 422, both the incoming name and the candidate name are broken into words. As previously described, this can be performed using a Java "StringTokenizer" method or a similar function if the names are not already separated into words. Assume for purposes of the following discussion that both of the names include two words (e.g., a first name and a last name).

At step 423, a preliminary score is calculated based on pairing each of the words of the incoming name with each of the words of the candidate name. For example, scores are calculated based on the first word of the input name and each of the names (first and last) of the candidate name. Similarly, scores are calculated based on the second word of the input name and each of the names of the candidate name. As described below in more detail, the score function takes into consideration a number of criteria when deciding the scoring of the two names, including the length of the words that make up the name, the number of matching letters, and the offset of letters within the name. More weight is given to letters being present near the start of the words being compared than at the end.

In the currently preferred embodiment, every word in a pre-matched (candidate) name is scored against every word in an incoming name. The calculation of a score may be illustrated by the following example in which "Dina Simpson" is the incoming name that has been pre-matched with the candidate name "Dino Armani". In this case, "Dina" is scored with "Dino" and "Armani", and similarly "Simpson" is also scored with both "Dino" and "Armani", resulting in a total of four preliminary scorings as shown below:

words score
('DINA', 'DINO') 833.83
('DINA', 'ARMANI') 472.72
('SIMPSON', 'DINA') 464.78
('SIMPSON', 'ARMANI') 437.01

The highest preliminary scores for the words in the name "Dina Simpson" are generated based on the words "Dina" and "Dino" (833.83) and by "Dina" and "Simpson" (464.72).

Next, at step 424, the method proceeds to calculate a final score based on the preliminary scoring. The final score is calculated based on the average of the sum of preliminary scores of the highest scoring combinations of words. This involves first determining the highest of the preliminary scores. The highest preliminary score is saved and the two words that generated this score are then eliminated from further consideration for purposes of calculating the final score. In the above example, given that the preliminary score for the words "Dina" and "Dino" is the highest, this score is used in the calculation and these words are then eliminated from the list. The scores of the remaining words are then evaluated. The highest remaining score is selected. For example, after the words "Dino" and "Dina" are removed from the list, the highest (and only) score remaining on the above list is the one calculated for the words "Armani" and "Simpson" (437.01). The final result is calculated as the average of the sum of these scores.

In the above example, the final result is calculated as the average of the sum of these scores as follows:
Dina=>Dino+Simpson=>Armani
(833.83+437.01)/2=635.42
Result=63.542%.

The final result is then compared to the established reporting threshold at step 425. If the final result exceeds the threshold, the method proceeds to block 430 as illustrated at FIG. 4A. Otherwise, if the result is less than the threshold, no further examination of these pre-matched names (i.e., the incoming name and a particular candidate name) is made. Note that the result of this particular example (63.542%) is unlikely to ever be reported (e.g., for further investigation) unless the reporting threshold established by the user is very low.

As illustrated above, the methodology of the present invention produces scores for each pre-matched name. If the score is above a threshold for reporting matches, then the match is reported (assuming the name is not already in a cleared list). The overall score for the name is the sum of the scores for all the words in the the name (either incoming names or candidate names) with the shortest number of words divided by the number of words in the shortest name. This is an important point, if the match is against a candidate name that has only one word in the name, the total score is calculated based on the best match for that one word, regardless of how many words are in the other name. Additional words in the other name do not contribute to the calculation of the score in the currently preferred embodiment.

In one embodiment, a performance optimization is made that combines pre-matching with scoring in SQL so as to quickly eliminate some pre-matches. Only names that pre-match and score the pre-matched word near the score threshold are passed back to the client process for further investigation, as in the following example where an incoming name "Laden" is being pre-matched:

select distinct name, ent$_{13}$id, type, list_type,
original_name_ind, alt_num
from PatQuickMatch
WHERE code in ("LTN") and
(score(quickname, "LADEN")>760.0)

In this example only suspects (candidate names) that have the code "LTN" match the first condition. If this is condition is satisfied, a score is calculated for the incoming name and the suspect name. If the word (quickname) and the incoming name generate a score greater than 760.0 (i.e., 76.00 percent), then the incoming name will be considered to be pre-matched. The pre-match value of 760.0 (76.00 percent) that is used above is an example and different thresholds may be used, as desired. However, for pre-match purposes a somewhat lower threshold is typically used than the threshold for evaluation and reporting of the final score value. For example, if a pre-match threshold of 76.00 percent is used, a more stringent threshold of 80.00 percent or more would typically be used for evaluation of the final score based on comparing other words of the name (if applicable). This is simply a performance optimization to provide for more of the processing to be performed by the database server and certain potential matches eliminated earlier.

In another alternative embodiment, the "PatQuickMatch" table containing codes for a list of suspects is loaded into an in-memory hash table. In this alternative embodiment, instead of using SQL to pre-match and score, the same pre-match functionality is achieved using only Java code. The use of Java code and an in-memory hash table provides for somewhat improved system performance. The operations of the score module in calculating a score based on a given pair of names will next be described in greater detail.

The following describes the process for calculating a score based on a given pair of names. Typically the score module calculates a score based on the incoming (or input) name and each of the names on a suspect list that "prematched" the incoming name. For example, the incoming name may have pre-matched to three "candidate" names on the suspect list. A score would then be calculated based on the input name and each of these three candidate names. It should be emphasized that score module examines all characters of the words of the name and does not calculate a score based on the codes generated by the pre-match module. The score module includes submodules for performing portions of the score calculations. The "score" method of the Match class shown in FIGS. 11A-11E calculates a score representing the degree of similarity between two words (i.e., a word of the name that was input for evaluation and a word of one candidate name from the suspect list).

As shown at line 1, the "score" method receives two Strings (i.e., Strings including a word of the input name and a word of a candidate name) as input parameters and returns a double representing the resulting score generated by the method. In the currently preferred embodiment, a score is calculated based on the words that make up the input name and the candidate name. A separate score is calculated for each word. Another method then calculates an overall score for the name based upon the values calculated by the above "score" method for words of the two names.

At lines 7-8 whitespace is removed from the words and the two words are both put into lower case. At lines 33-36 a check is made to determine if the two input Strings are equal. This is an optimization to avoid extra processing in the event the two words are an exact match. If the two words are equivalent (i.e., an exact match such as "Cathal" and "Cathal"), then the score method will return a result which will indicate a degree of similarity of 100%.

If the two words are not an exact match, the score is calculated by examining the two words letter by letter. Generally, two words which have a number of instances with the same character in the same position will generate a higher score. For example, if the first letter in both of the words is identical, then a certain value is assigned. The second character is then examined, and so on and so forth. The value that is assigned for each characters is based, among other factors, on the number of characters in the words that are being compared. In addition, the valuation used in the currently preferred embodiment gives greater weight to matching characters at the beginning of the words. In other words, matching characters at the start of the words are given greater weight than those towards the end of the words. One reason for utilizing this approach is that transcription errors in recording names tend to be made more frequently towards the end of words rather than with the initial characters.

In addition to looking for instances in which the same characters are in the same position in the two words, the "score" method also looks for transpositions. For example, the first word may be "Cathal" while the second may be "Cahtal" (e.g., because of a transposition error when writing the second word). Accordingly, a letter (character) does not have to appear in exactly the same position in order to contribute to the result (i.e., the score) that is calculated. If the matching letter appears in another nearby position, it will contribute to the score calculated for the words, but the resulting score will be less than if the matching letter is in the same position in each of the words. For example, the words "Cathal" and "Cahtal" will generate a score of 90% or more because the two words have the same number of characters and the same characters, with the only difference being the transposition of the order of two characters 't' and 'h'. However the words "Cathal" and "Cahalt" will generate a lower score (e.g., less than 90%) as there is more than one transposition and the matching characters are further away from each other (e.g., the 't' in position 3 of the first word and in position 6 of the second word).

To facilitate this process of checking for transpositions, the method provides for the start and end points to roll with the position of the character in the first word. If the character at the current position of the first word does not match the character at the same position of the second word, the examination "window" is then opened a little wider to examine the character of the second word immediately before or immediately after the current position. For example, assume the current character is 't' in the third position of the word "Cathal" and the second word is "Cahalt". In this case, the letter in the third position of the second word is 'h', which is not a match. The letters before and after the 'h' are then examined. In this example neither of these characters match. Generally, the "window" that is opened up for examining other characters is approximately one-quarter (25%) of the length of the string in either direction (i.e., one-quarter of the length before or after the current position). In this example, no match is found for the letter 't' of the first word within this window, so it will not contribute towards the score calculated for these words.

The result (i.e., score) for the two words is then calculated by adding the values for each position as provided commencing at line 128 of the above "score" method. The value that is assigned is based (among other factors) on the number of matching characters ("nomChars") found in the words and the total number of characters in the shorter of the two words. As provided at lines 128, 136, 144, and 152, the number of matching characters ("nomChars") is examined for determining the value to be used for each match when calculating the total score. The total score is then added as provided at line 165.

This total score may, however, be adjusted based on the length of the two words being compared. First, the score may be adjusted based on a disparity in the length of the two words. For example, the words "Jo" and "Josephine" generate a score of 1.000 (representing a 100% match) as the first two characters of the words are identical. As provided at lines 169-170, the calculated score is adjusted (by multiplying the calculated score by 0.85) if the length of the first word and second word are significantly different. In the example, the score of the words "Jo" and "Josephine" would be adjusted 0.850 (representing a 85% match). Alternatively, the score may be adjusted if the length of the two words is two characters as shown at lines 173-175. In this case the adjustment made as a result of one of the words including only two characters is to multiple the calculated score by 0.925. These adjustments are made because the total score generated by the normal calculation is deemed to be less reliable in these instances where the words are short or where the length of the words is greatly disparate.

As shown at line 178, the method returns a value equal to the calculated score multiplied by 1000. After the score for each of the words in the two names is calculated by the above "score" function, the overall score for the two names is determined. In the case of two names each consisting of two words, the "score" method will generate a total of four scores. The final result is then calculated by first determining the highest of these scores and saving this score. The words generating the highest score are then eliminated from consideration. The next highest score for the remaining words is then determined. As previously described, the final result is the average of the sum of these scores. If the final result exceeds the reporting threshold established by the user, the matching name is then reported to the user (subject to optionally checking the cleared list). Currently, the final result reported to the user is normalized to represent a percentage value (between zero and 100) indicating the degree of similarity between the name that was input and the candidate name from the list of suspects.

Intelligent Surname Recognition

The system, in it currently preferred embodiment, also includes an optional "intelligent surname recognition feature". This feature may be used to more accurately determine name matches in cases where it is possible to say with certainty whether a word in a name is a forename or a surname. Of course some names are neither forenames nor surnames. For instance, if a candidate name is a corporation name it will not have a forename or surname. However, in the case where the subject type is clearly an individual, surnames can usually be distinguished from forenames—although it should noted that one can never say with any certainty that a given word of an incoming name is a forename or surname. As there is no known reliable way to distinguish surnames and forenames in handling incoming names, the intelligent surname recognition feature of the present invention focuses on the list(s) of suspect (candidate) names. In many cases the forenames and surnames of candidate names can be readily distinguished.

In a situation in which the surname of a candidate name can be distinguished, the intelligent surname recognition feature provides for adjusting the scoring process described above to give the surname portion of the name an extra weighting in scoring and to appropriately lessen the value of the scores of the forename(s). Currently, in most cases the surname is increased by a multiplier of 1.2 and the forename is lessened by a multiplier of 0.8. Provision is also made for multiple (or "multi-barreled") surnames and forenames. In the currently preferred embodiment, the intelligent surname recognition feature is turned on by default but can be switched off by a user (e.g., by toggling on an "intelligentSurnameMatching" value in a system "Filter.properties" file).

Special Case for One Word Matching

One of the more difficult name matching scenarios occurs when only one word is present in a name. The name with only one word can either be an incoming name or a suspect (candidate) name. In fact, a number of suspect names may have only one word as the suspect list may include acronyms and aliases (e.g., "brothers" is a valid suspect name from the Specially Designated Nationals (SDN) list maintained by the Office of Foreign Assets Controls). A name can also be left with only one word when "short words" and "stop words" are removed as described below.

The system provides an (optional) capability to remove "short words" and "stop words" from the calculation of scores. "Stop words" are frequently occurring words that are deemed irrelevant for matching purposes. The words "and", "Inc.", and "company" are examples of frequently occurring words that may be considered as "stop words". In the currently preferred embodiment of the system, stop words may be added to (and deleted from) from a stop word list by the user. "Short words" are words that are considered too short to be useful in matching. Typically, a short word is a word with two or fewer characters, such as abbreviations of names, titles, or initials. (However, if an incoming name consists solely of short words then these words are usually analyzed and scored.)

As a significant number of incoming names typically "prematch" with a suspect name that has only one word, a parameter (e.g., a "oneWordScoreThreshold" parameter) is provided in the currently preferred embodiment to allow for one word scores to be adjusted. The score of a one word name is multiplied by this parameter which is a number between zero and one. This typically forces the match, if it contains only one word, to be nearly identical. For example, if the reporting threshold is 80.00 percent and the oneWordScoreThreshold is 0.8 then the word must match perfectly for it to create a case. If oneWordScoreThreshold is set to 0.9 then some minor misspelling will still generate a reported match, but only in the event that the misspelling is very minor. The oneWordScoreThreshold may be set to 1.0 to provide for neutral treatment of one-word names. In all cases when only one word is present in either an incoming or suspect name, the overall score is simply the score calculated for that one word, subject to any applicable adjustment.

Translations and Equivalent Names

Names can be frequently disguised by translation into another language. The system of the present invention addresses this problem by keeping lists of names and their translations (equivalent names) in languages other than English. For example, the the equivalent names for the name "Adrian" include the following: Ada, Adok, Adorian, Adrian, Adriance, Adrianna, Adriano, Adrien, Adrienne, Adrik, Adya, Andreian, Andreyan, Andrian, Andriyan, and Hadrian. In the currently preferred embodiment, the names are stored in a "PatEqNames" table.

Users are also provided with the capability to add or remove equivalent names and create new lists of equivalent names. Currently, all of the name translations that are included are translations for forenames only, but surnames or company names could also be added, if desired. It should be noted that it is not necessary to have a translation of a name in order for the name to match as most translations are only minor spelling differences and the system of the present invention is already designed to address small differences in spelling. For instance, in the above list "Adrian" and "Adrien" match fairly closely and even without having translations (i.e., a list of equivalent names), both have the name code "ATRN" and generate a score of 88.94 percent when compared.

Translations of suspect names generated in one embodiment of the system are stored in the "PatQuickMatch" table with an "original_name_ind" column of this table set to a numeric value of one ("1"). Original names in the same table have a value of zero ("0"). The translation (equivalent name) feature can be disabled by the user simply by adding "and original_name_ind=0" to the "WHERE" clause of any of the search strings or by deleting rows from the "PatQuickMatch" table where the "original_name_ind" column is equal to one ("1").

More matches are created and reported if the name translation features are enabled, simply because more names match when they are translated. However, it is a performance overhead to have translations enabled as additional prematching and scoring is required. In fact, in one embodiment name equivalents account for more than half the rows in the "PatQuickMatch" table. During testing it was determined that including equivalent names (name translations) resulted in a slightly higher number of matches. A typical test involving one thousand names resulted in ten matches without enabling the translation (equivalent names) feature, while activating the equivalent names feature resulted in an average of thirteen matches (i.e., three additional matches out of one thousand names). However, activating the feature also resulted in lower system throughput. Initial testing indicated that enabling equivalent names slowed throughput by approximately 50 percent.

Good Sounding Match Override

After scoring many (or sometimes all) of the potential matches are eliminated as they do not exceed the reporting (score) threshold. However, a "good sounding match override" option is provided in the presently preferred embodiment for causing certain incoming names that pre-matched a suspect name, but scored just under the threshold, to be reported. Names that scored under the threshold are only reported in the event that the score is near the threshold and if the codes for all the words in the incoming name match all of the codes in the pre-matched suspect name. (Recall than the norm is for a match to be reported if only one word pre-matched and the score for all the words averaged over the threshold.) Typically the "good sounding match override" is set to only report a match if the score was within a few percentage points of the threshold.

For example, a user can activate this feature and can establish a "goodSoundingMatchOverrideThreshold" equal to 76.00 percent. In this example "good sounding" matches are enabled and will be reported if the score is above 76.00% and the code values for all the words in the incoming and suspect name match. This "good sounding match" feature is tunable by the user or the user can choose to completely deactivate the feature, as desired.

Cleared List

In any given application it may be necessary to eliminate some names from a result set if they appear repeatedly. The cleared list allows an application (e.g., a bank anti-money laundering application) to determine that in a particular circumstance the two names under comparison do not really represent the same person. For example, a bank may have a valued customer named Ben Laden that holds a bank account with the number "123456789" that has already been cleared by the bank (e.g., by human examination of identity documentation and other information). An an anti-money laundering application utilizing the system and methodology of the present invention for name matching might generate a high score in matching this name with the name "Usama Bin Ladin" which is on the suspect list. However, because the account holder's name is associated with the known account number and/or another unique identifier, the anti-money laundering application can determine that this name refers to a known customer on the cleared list that holds a particular bank account number.

Relational Database Support

The search engine system and methodology of the present invention can be implemented in database systems to provide a more sophisticated and accurate name search capability than current "Soundex" functions. The system of the present invention can be used in any database that supports the concept of user-defined functions. For example, 'SELECT code ("HOMER")' is a valid SQL statement, as is 'SELECT score ("HOMER", "HUMER")' which can utilize the code and score features of the present invention, respectively. As described above, the system and methodology of the present invention for a more fine-grained analysis of names and generates more useful results than existing database solutions.

Configuration and Administration Options

The search engine system of the present invention can be accessed and used through a number of different user interfaces. In the system of the currently preferred embodiment, these interfaces are web enabled "portlets" providing for access from any connected device on which the user has access to a browser. The following will describe several interfaces provided in the currently preferred embodiment that may be used for configuration and administration of the system.

Figure 5A:
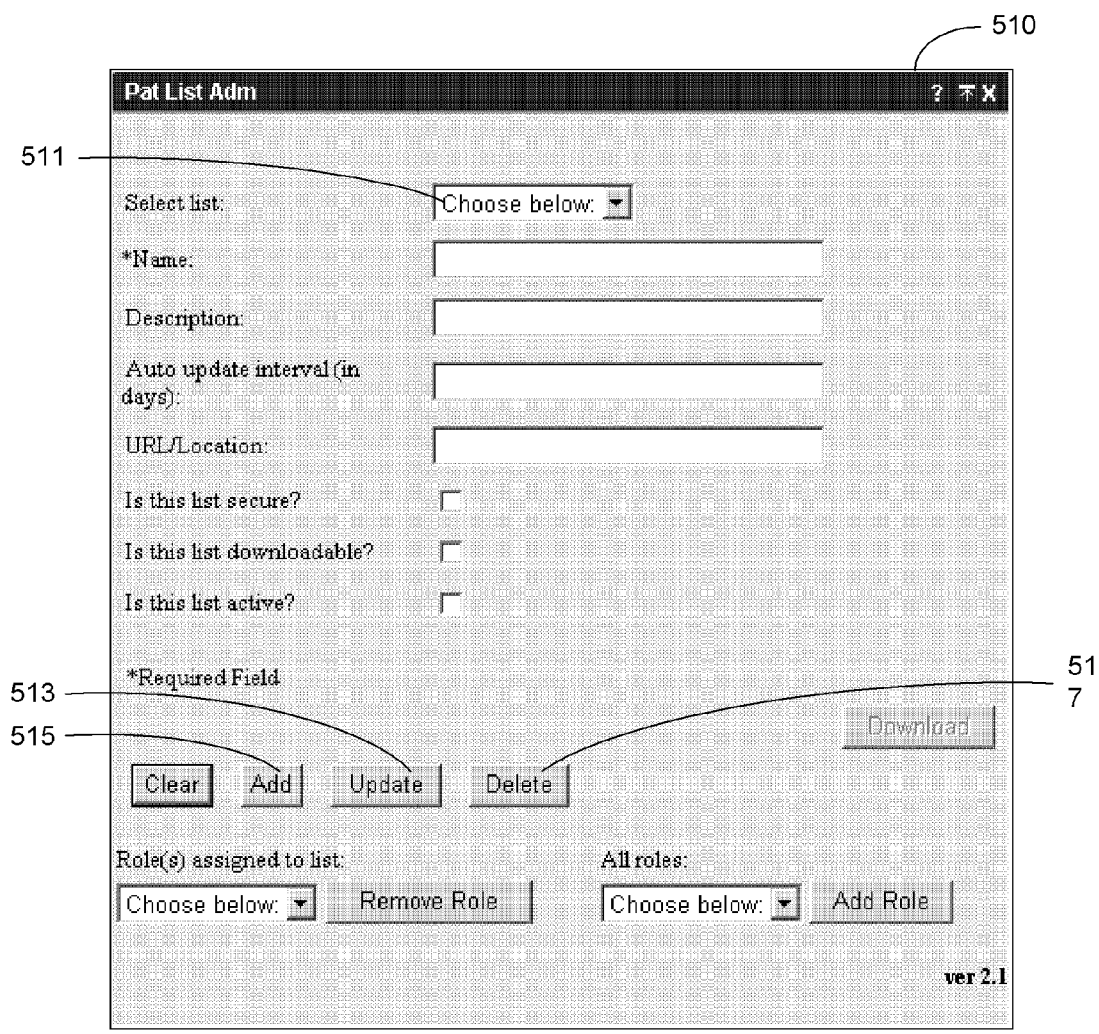
FIG. 5A illustrates a list administration interface that can be used to select a list of names or to create, modify, and delete a list of names.

FIG. 5A illustrates a list administration interface 510 that can be used to select a list of names (e.g., a suspect list) or to create, modify, and delete lists of names. For instance, an existing suspect list may be selected from a "Select list" drop down menu 511 as shown at FIG. 5A. A user can then update or delete one or more suspects on the selected suspect list and perform an update or delete by selecting an "Update" button 513 or a "Delete" button 517. A new list can also be created by selecting "New" from the drop down menu 511, entering appropriate information, and selecting the "Add" button 515 to add the new suspect list.

FIG. 5B illustrates a list entry administration interface 520 that can be used to view, modify, or add an entry into a list of names (e.g., a suspect list). A search can be made based on a given suspect's name by entering the name in the "Look up name (or partial name)" field 522. A "Search Tips" link 524 may be used to consult tips on how to perform a search (e.g., a partial search). Also a user can browse an entire suspect list, by selecting a list from the "Browse a suspect list" drop down menu 526 and pressing the "Browse list" button 528. If there is a match in the system, a list of matching suspects will appear. A user may then select (e.g., click on) a particular suspect to obtain specific information about the suspect. Alternatively, a user can scroll through the list of suspects that match the specified search criteria. An additional interface is also provided (not shown) in one embodiment which enables a user to add suspects to a list or to update or delete entries.

The system of the present invention also provides the user with the ability to customize various settings to modify the search (or filter) parameters. For instance, a user can modify the cleared list, the equivalent names, and the stop words. Several of these features for customizing the search parameters will now be briefly described.

Figure 5C:
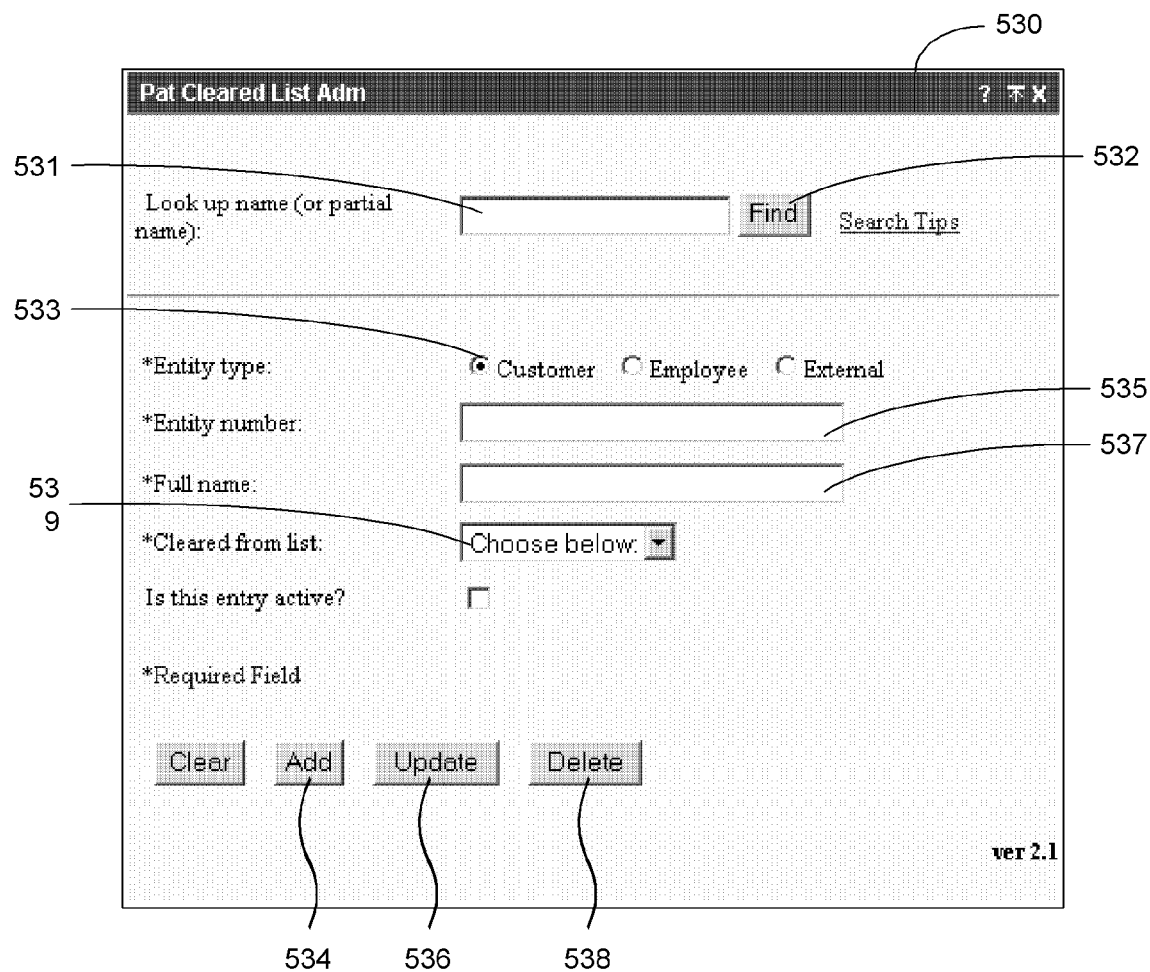
FIG. 5C is a cleared list administration interface which provides for placing customers, employees, or external entities on a cleared list.

FIG. 5C is a cleared list administration interface 530 which provides for placing customers, employees, or external entities on a "cleared list" to allow their transactions to pass through the solution and not be flagged (i.e., reported) as a "hit" or "match". The cleared list administration interface 530 is used to administer this cleared list. Entries can be searched, entered, or flagged as inactive using this interface. Currently, once an entry is placed on the "cleared list" it cannot be removed. If it is necessary to remove the entry from the cleared list, the entry can be flagged as "inactive".

As shown at FIG. 5C, the entity number and name of an entry can be entered in fields 535, 537 in the lower part of the interface 530. The type of entity can also be identified using the buttons in this portion of the interface (e.g., by selecting the "customer" button 533). The list the entity is to be cleared from can be selected from the drop down menu 539. Once all of the appropriate fields have been filled out, a user may select the "Add" button 534 to create a new entry or the "Update" button 536 to update an existing entry. A user may also delete an entry by finding the name (e.g., using the "Look up name" field 531 and the "Find" button 532) and then clicking the "Delete" button 538. This currently causes the entry to be set to "inactive", which means that although it is still in the system, it will not be considered as "cleared" in a suspect search. To reactivate an entry, a user may display the entry and select the "Add" button 534.

The top half of the cleared list administration interface 530 may also be used more to search the cleared list for a particular entry. A user can enter a name in the "Look up name" field 531. The name may include wildcards (e.g., one or more "*"

symbols). When the user selects the "Find" button 532, the matching records will be displayed.

In addition to the cleared list administration interface 530, the currently preferred embodiment of the present invention also provides an equivalent names (or "EqNames") interface which is used to maintain lists of translations of forenames as previously described. This "intelligent name matching" feature can be turned off or on by the user, or the user can add an "and original_name_ind=0" statement in the appropriate column of a "Filter.properties" file in order to deactivate this feature. The system also includes a "stop words" administration interface which can be used to maintain the list of "stop words". As described above, "stop words" are frequently occurring words in the transactions that a user may deem to be irrelevant for the purposes of the suspect search.

Search Interface

In addition to the above interfaces for configuring the system and administering lists of names (e.g., suspect lists and cleared lists), the system also includes features for searching for particular names. FIG. 6 illustrates a suspect search list interface 600 that is provided in the currently preferred embodiment of the system. The suspect search interface 600 provides for a user to use the search engine of the present invention to submit a particular name and determine whether the name matches (or is very similar to) a name on one or more suspect list(s).

Currently, up to five suspect names can be entered into name fields of the interface 600 at one time. As shown at FIG. 6, a particular name is entered into a name field 611. The user may then also select a country, if known, using the country fields that are immediately below the name fields. For example, a country name could be entered into country field 621 (although no country has been entered in the example shown at FIG. 6). After entering names and/or countries, a user may then select the "Search for Suspect" button 635 to initiate a search.

Sample results for a search are shown in the lower portion 650 of the suspect search interface 600. As shown, in this case the system returned a list that includes two suspects together with a percentage score for each suspect. As described above, the score indicates the percentage likelihood that the listed suspect is a match for the name that was entered by the user. The user may then select (e.g., clicking on) a particular suspect entry to obtain more detailed information about a suspect.

Auditing Administrative Activity

Additional interfaces are provided to enable a user to perform other tasks, including auditing administrative activity. For example, a user may view a log of the database events that have been performed and may have affected the suspect list, the cleared list, or other solution data. Changes made are automatically logged and a user can select a reporting period to audit and obtain information about changes made during the reporting period. For example, a user can audit changes to suspect lists, changes to cleared lists, and deletion of customer data.

Extracting Names from Within Longer Strings of Text

The system also has the capability to perform "fuzzy" searches that will extract names from longer strings of text. For example, the system can extract the name "Usama Bin Laden" from the string: "Usama Bin Laden graduated from King Abdul Aziz University in Jiddah with a degree in civil engineering."

While the invention is described in some detail with specific reference to a single preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

The invention claimed is:

1. A method for determining whether a particular name matches any names on a list of names, said particular name comprising one or more words, the method comprising:

generating codes characterizing the particular name by generating a code for each word of the particular name that is based at least in part on phonetic sounds of the word and on whether characters of the word match a pattern occurring in a proper name in a given natural language;

deriving an initial set of any matching names by comparing the codes of the particular name against corresponding codes for the list of names;

deriving a final set of any matching names by comparing, on a character by character basis, each word of the particular name against each word of every name in the initial set; wherein deriving the final set includes calculating a score based upon combinations of words of the particular name and words of names in the initial set;

wherein calculating a score is based, at least in part, upon number of matching characters determined by said comparing of words of the particular name against words of names in the initial set, and wherein matching characters at the beginning of words of the particular name and the beginning of words of names in the initial set are weighted higher in calculating the score than matching characters at the end of words of the particular name and the end of words of names in the initial set;

determining whether the particular name is on a cleared list of names, based on a unique identifier associated with the particular name;

when the particular name is on the cleared list of names, ignoring any matching names in the final set; and when the particular name is not on the cleared list of names, displaying any matching names in the final set having a score greater than an established threshold to allow further examination of the particular name and any matching names in the final set.

2. The method of claim 1, wherein said step of calculating a score is based, at least in part, on how well characters correlate between respective words.

3. The method of claim 2, wherein said step of calculating a score includes determining whether a character at a certain position in a first word is at the certain position in a second word.

4. The method of claim 3, wherein said step of calculating a score includes determining whether a character at the certain position in the first word is at a different position in the second word.

5. The method of claim 1, wherein said step of calculating a score is based, at least in part, upon a position in a word at which a matching character is located.

6. The method of claim 1, wherein said step of calculating a score includes calculating preliminary scores based on pairing each word of the particular name with each word of a name in the initial set.

7. The method of claim 6, wherein said step of calculating a score further comprises calculating an average of at least some of the preliminary scores.

8. The method of claim 1, wherein said step of deriving a final set further comprises determining whether the score exceeds an established threshold.

9. The method of claim 8, wherein said established threshold is established by a user.

10. The method of claim 1, wherein said step of deriving a final set is based, at least in part, on length of words of the particular name and words of names in the initial set.

11. The method of claim 1, wherein said step of deriving an initial set includes determining if at least one code generated for the particular name matches a code for a name on the list of names.

12. The method of claim 1, wherein the list of names comprises a watch list.

13. The method of claim 1, wherein said step of generating codes includes parsing the particular name into words.

14. The method of claim 1, wherein said step of generating codes includes removing superfluous characters.

15. The method of claim 1, wherein said step of generating codes includes equating like-sounding characters.

16. The method of claim 1, wherein said step of generating codes includes generating a single code value based on a plurality of characters.

17. The method of claim 1, wherein said step of generating codes includes examining a character in a word in context of other characters in the word.

18. The method of claim 1, wherein said step of generating codes includes generating two codes for each word of the particular name, with each of the two codes representing a different pronunciation.

19. The method of claim 1, wherein said step of generating codes includes evaluating a plurality of characters to identify particular patterns of characters.

20. The method of claim 19, wherein said particular patterns comprise patterns of characters common in particular natural languages.

21. A system for determining whether a particular name matches any names on a list of names, said particular name comprising one or more words, the system comprising:
- a computer having a processor and memory;
- a code module configured to generate codes characterizing the particular name by generating a code for each word of the particular name that is based at least in part on phonetic sounds of the word and on whether characters of the word match a pattern occurring in a proper name in a given natural language;
- a pre-match module configured to derive an initial set of any matching names by comparing the codes of the particular name against corresponding codes for the list of names;
- a score module configured to derive a final set of any matching names by comparing, on a character by character basis, each word of the particular name against each word of every name in the initial set; wherein said score module calculates a score based upon combinations of words of the particular name and words of names in the initial set;
- wherein said score module calculates a score based, at least in part, upon number of matching characters determined by said comparing of words of the particular name against words of names in the initial set, and wherein matching characters at the beginning of words of the particular name and the beginning of words of names in the initial set are weighted higher in calculating the score than matching characters at the end of words of the particular name and the end of words of names in the initial set; and
- a module configured to determine whether the particular name is on a cleared list of names, based on a unique identifier associated with the particular name, wherein said module is further configured to:
    - when the particular name is on the cleared list of names, ignore any matching names in the final set, and
    - when the particular name is not on the cleared list of names, display any matching names in the final set having a score above an established threshold to allow further examination of the particular name and any matching names in the final set.

22. The system of claim 21, wherein said score module calculates a score based, at least in part, on how well characters correlate between respective words.

23. The system of claim 22, wherein said score module determines whether a character at a certain position in a first word is at the certain position in a second word.

24. The system of claim 23, wherein said score module determines whether a character at the certain position in the first word is at a different position in the second word.

25. The system of claim 21, wherein said score module calculates a score based, at least in part, upon a position in a word at which a matching character is located.

26. The system of claim 21, wherein said score module calculates preliminary scores based on pairing each word of the particular name with each word of a name in the initial set.

27. The system of claim 26, wherein said score module calculates a score by averaging at least some of the preliminary scores.

28. The system of claim 21, wherein said score module determines whether the score exceeds an established threshold.

29. The system of claim 28, wherein said established threshold is established by a user.

30. The system of claim 21, wherein said score module derives a final set based, at least in part, on length of words of the particular name and words of names in the initial set.

31. The system of claim 21, wherein said pre-match module determines if at least one code generated for the particular name matches a code for a name on the list of names.

32. The system of claim 21, wherein the list of names comprises a watch list.

33. The system of claim 21, wherein said code module parses the particular name into words.

34. The system of claim 21, wherein said code module removes superfluous characters.

35. The system of claim 21, wherein said code module equates like-sounding characters.

36. The system of claim 21, wherein said code module generates a single value for inclusion in a code based on a plurality of characters.

37. The system of claim 21, wherein said code module examines a character in a word in context of other characters in the word.

38. The system of claim 21, wherein said code module generates two codes for each word of the particular name, with each of the two codes representing a different pronunciation.

39. The system of claim 21, wherein said code module evaluates a plurality of characters of a word to identify particular patterns of characters.

40. The system of claim 39, wherein said particular patterns comprise patterns of characters common in particular natural languages.

41. A method for assisting a user in determining whether a particular name matches any suspect name on a suspect list, said particular name having one or more words, the method comprising:
- generating a code for each word of said particular name based at least in part on phonetic sound and on patterns of characters occurring in names in natural languages;

identifying a set of potentially matching names by comparing codes generated for said particular name with codes generated for suspect names on the suspect list;

for each suspect name in the set of potentially matching names, calculating a score based, at least in part, upon correlation of characters between each word of said particular name and each word of the suspect name;

wherein calculation of the score is based, at least in part, upon number of matching characters in a first word and a second word, wherein matching characters at the beginning of the first word and the beginning of second word are weighted higher in calculation of the score than matching characters at the end of the first word and the end of second word;

if the sore calculated for said particular name and the suspect name exceeds a threshold, determining whether said particular name is on a cleared list of names, based on a unique identifier associated with said particular name;

when the particular name is on the cleared list of names, ignoring the match; and when the particular name is not on the cleared list of names, reporting the match to the user to allow further examination of the particular name.

42. The method of claim 41, wherein the suspect list comprises a watch list.

43. The method of claim 41, wherein said step of generating a code includes parsing said particular name into words.

44. The method of claim 41, wherein said step of generating a code includes removing superfluous characters.

45. The method of claim 41, wherein said step of generating a code includes equating like-sounding characters.

46. The method of claim 41, wherein said step of generating a code includes generating a single code value based on a plurality of characters.

47. The method of claim 41, wherein said step of generating a code includes examining a character in a word in context of other characters in the word.

48. The method of claim 41, wherein said step of generating a code includes generating a plurality of codes for a word having more than one common sound.

49. The method of claim 41, wherein said step of generating a code includes evaluating a plurality of characters to identify particular patterns of characters.

50. The method of claim 49, wherein said particular patterns comprise patterns of characters common in particular natural languages.

51. The method of claim 41, wherein said step of calculating a score includes calculating preliminary scores based on pairing each word of said particular name with each word of the suspect name.

52. The method of claim 51, wherein said step of calculating a score includes calculating an average of at least some of the preliminary scores.

53. The method of claim 41, wherein said step of calculating a score includes comparing a character at a certain position in a first word with a character at the certain position in a second word.

54. The method of claim 53, wherein said step of calculating a score further comprises determining whether the character at the certain position of the first word is at a different position in the second word.

55. The method of claim 41, wherein said step of calculating a score is based, at least in part, upon a position in a word at which a matching character is located.

56. The method of claim 41, wherein said step of calculating a score is based, at least in part, on length of words of said particular name and the suspect name.

57. The method of claim 41, wherein said step of calculating a score is based, at least in part, on number of words of said particular name and the suspect name.

58. The method of claim 41, wherein said step of reporting the match includes reporting the score calculated for said particular name and the suspect name.

59. A computer readable medium encoded with a computer program, the program comprising instructions that when executed by one or more processors cause the one or more processors to perform operations comprising:

generating codes characterizing a particular name comprising one or more words, by generating a code for each word of the particular name that is based at least in part on phonetic sounds of the word and on whether characters of the word match a patter occurring in a proper name in a given natural language;

deriving an initial set of any matching names by comparing the codes of the particular name against corresponding codes for a list of names;

deriving a final set of any matching names by comparing, on a character by character basis, each word of the particular name against each word of every name in the initial set, wherein deriving the final set includes calculating a score based upon combinations of words of the particular name and words of names in the initial set, wherein calculating a score is based, at least in part, upon a number of matching characters determined by said comparing of words of the particular name against words of names in the initial set, and wherein matching characters at the beginning of words of the particular name and the beginning of words of names in the initial set are weighted higher in calculating the score than matching characters at the end of words of the particular name and the end of words of names in the initial set;

determining whether the particular name is on a cleared list of names, based on a unique identifier associated with the particular name when the particular name is on the cleared list of names, ignoring any matching names in the final set; and when the particular name is not on the cleared list of names, displaying any matching names in the final set having a score greater than an established threshold to allow further examination of the particular name and any matching names in the final set.

60. A computer readable medium encoded with a computer program, the program comprising instructions that when executed by one or more processors cause the one or more processors to perform operations comprising:

generating a code for each word of a particular name comprising one or more words, based at least in part on phonetic sound and on patterns of characters occurring in names in natural languages;

identifying a set of potentially matching names by comparing codes generated for said particular name with codes generated for suspect names on a suspect list;

for each suspect name in the set of potentially matching names, calculating a score based, at least in part, upon correlation of characters between each word of said particular name and each word of the suspect name;

wherein calculation of the score is based, at least in part, upon number of matching characters in a first word and a second word, wherein matching characters at the beginning of the first word and the beginning of the second word are weighted higher in calculation of the score than matching characters at the end of the first word and the end of the second word;

if the score calculated for said particular name and the suspect name exceeds a threshold, determining whether said particular name is on a cleared list of names, based on a unique identifier associated with said particular name;
when the particular name is on the cleared list of names, ignoring the match; and
when the particular name is not on the cleared list of names, reporting the match to the user to allow further examination of the particular name.

* * * * *